(12) United States Patent
Deng et al.

(10) Patent No.: US 11,539,949 B2
(45) Date of Patent: Dec. 27, 2022

(54) DETERMINATION OF PICTURE PARTITION MODE BASED ON BLOCK SIZE

(71) Applicants: Beijing Bytedance Network Technology Co., Ltd., Beijing (CN); Bytedance Inc., Los Angeles, CA (US)

(72) Inventors: Zhipin Deng, Beijing (CN); Li Zhang, San Diego, CA (US); Kai Zhang, San Diego, CA (US); Hongbin Liu, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/582,600

(22) Filed: Jan. 24, 2022

(65) Prior Publication Data

US 2022/0150491 A1 May 12, 2022

Related U.S. Application Data

(63) Continuation of application No. PCT/CN2020/104785, filed on Jul. 27, 2020.

(30) Foreign Application Priority Data

Jul. 26, 2019 (CN) .................. PCT/CN2019/097926
Aug. 31, 2019 (CN) .................. PCT/CN2019/103892

(51) Int. Cl.
*H04N 7/12* (2006.01)
*H04N 19/119* (2014.01)
(Continued)

(52) U.S. Cl.
CPC .............. *H04N 19/119* (2014.11); *G06T 9/40* (2013.01); *H04N 19/107* (2014.11);
(Continued)

(58) Field of Classification Search
CPC .................................................... H04N 19/127
See application file for complete search history.

(56) References Cited

U.S. PATENT DOCUMENTS 9,838,712 B2 12/2017 Lin et al.
10,136,143 B2 11/2018 Zhang et al.
(Continued)

FOREIGN PATENT DOCUMENTS

CN 103299637 A 9/2013
CN 103503457 A 1/2014
(Continued)

OTHER PUBLICATIONS

Bross et al. "Versatile Video Coding (Draft 3)" Joint Video Experts Team (JVET) of ITU-T SG 16 WP 3 and ISO/IEC JTC 1/SC 29/WG 11 12th 13th Meeting: Marrakech, MA, Jan. 9-18, 2019, JVET-M1001, 2019.http://phenix.it-sudparis.eu/jvet/doc_end_user/current_document.php?id=5755.
(Continued)

*Primary Examiner* — Y Lee
(74) *Attorney, Agent, or Firm* — Perkins Coie LLP

(57) ABSTRACT

Methods, systems, and devices for coding or decoding video wherein the picture partition mode is based on block size are described. An example method for video processing includes using a dimension of a virtual pipeline data unit (VPDU) used for a conversion between a video comprising one or more video regions comprising one or more video blocks and a bitstream representation of the video to perform a determination of whether a ternary-tree (TT) or a binary tree (BT) partitioning of a video block of the one or more video blocks is enabled, and performing, based on the determination, the conversion, wherein the dimension is equal to VSize in luma samples, wherein dimensions of the video block are CtbSizeY in luma samples, wherein
(Continued)

VSize=min(M, CtbSizeY), and wherein M is a positive integer.

19 Claims, 18 Drawing Sheets

(51) Int. Cl.
| | | |
|---|---|---|
| *H04N 19/96* | (2014.01) | |
| *H04N 19/107* | (2014.01) | |
| *H04N 19/109* | (2014.01) | |
| *H04N 19/11* | (2014.01) | |
| *H04N 19/127* | (2014.01) | |
| *H04N 19/132* | (2014.01) | |
| *H04N 19/167* | (2014.01) | |
| *H04N 19/172* | (2014.01) | |
| *H04N 19/176* | (2014.01) | |
| *H04N 19/186* | (2014.01) | |
| *H04N 19/189* | (2014.01) | |
| *H04N 19/169* | (2014.01) | |
| *H04N 19/60* | (2014.01) | |
| *H04N 19/61* | (2014.01) | |
| *H04N 19/70* | (2014.01) | |
| *G06T 9/40* | (2006.01) | |

(52) U.S. Cl.
CPC ........... *H04N 19/109* (2014.11); *H04N 19/11* (2014.11); *H04N 19/127* (2014.11); *H04N 19/132* (2014.11); *H04N 19/167* (2014.11); *H04N 19/172* (2014.11); *H04N 19/176* (2014.11); *H04N 19/186* (2014.11); *H04N 19/189* (2014.11); *H04N 19/1883* (2014.11); *H04N 19/60* (2014.11); *H04N 19/61* (2014.11); *H04N 19/70* (2014.11); *H04N 19/96* (2014.11)

(56) References Cited

U.S. PATENT DOCUMENTS

| | | | |
|---|---|---|---|
| 10,165,285 | B2 | 12/2018 | Yang et al. |
| 10,306,229 | B2 | 5/2019 | Zhao et al. |
| 10,567,799 | B2 | 2/2020 | Liu et al. |
| 11,159,795 | B2 | 10/2021 | Zhao et al. |
| 2016/0234510 | A1 | 8/2016 | Lin et al. |
| 2017/0064335 | A1 | 3/2017 | Na et al. |
| 2017/0195676 | A1 | 7/2017 | Chuang et al. |
| 2018/0109814 | A1 | 4/2018 | Chuang et al. |
| 2018/0146205 | A1 | 5/2018 | Hellman |
| 2018/0343455 | A1 | 11/2018 | Jang et al. |
| 2019/0075328 | A1 | 3/2019 | Huang et al. |
| 2020/0014946 | A1 | 1/2020 | Xu et al. |
| 2020/0037002 | A1 | 1/2020 | Xu et al. |
| 2020/0120339 | A1 | 4/2020 | Chiang et al. |
| 2020/0137398 | A1 | 4/2020 | Zhao et al. |
| 2020/0204819 | A1 | 6/2020 | Hsieh et al. |
| 2020/0252608 | A1 | 8/2020 | Ramasubramonian et al. |
| 2020/0304789 | A1 | 9/2020 | Zhao et al. |
| 2021/0006787 | A1 | 1/2021 | Zhang et al. |
| 2021/0006788 | A1 | 1/2021 | Zhang et al. |
| 2021/0051324 | A1 | 2/2021 | Zhang et al. |
| 2021/0076034 | A1 | 3/2021 | Misra et al. |
| 2021/0092379 | A1 | 3/2021 | Zhang et al. |
| 2021/0120275 | A1 | 4/2021 | Misra et al. |
| 2021/0152846 | A1 | 5/2021 | Zhang et al. |
| 2021/0250602 | A1 | 8/2021 | Zhang et al. |
| 2021/0258575 | A1 | 8/2021 | Zhang et al. |
| 2021/0266562 | A1 | 8/2021 | Zhang et al. |
| 2021/0266581 | A1 | 8/2021 | Jung et al. |
| 2021/0368185 | A1 | 11/2021 | Zhang et al. |
| 2021/0377528 | A1 | 12/2021 | Zhang et al. |
| 2021/0385451 | A1 | 12/2021 | Zhang et al. |
| 2022/0086428 | A1* | 3/2022 | Lim .................... H04N 19/186 |

FOREIGN PATENT DOCUMENTS

| | | |
|---|---|---|
| CN | 104604225 A | 5/2015 |
| CN | 109923866 A | 8/2019 |
| EP | 3376764 A1 | 11/2016 |
| EP | 3381186 A1 | 10/2018 |
| JP | 2014045434 A | 3/2014 |
| WO | 2016090568 A1 | 6/2016 |
| WO | 2017083710 A1 | 5/2017 |
| WO | 2017123980 A1 | 7/2017 |
| WO | 2017222331 A1 | 12/2017 |
| WO | 2018131523 A1 | 7/2018 |
| WO | 2018217024 A1 | 11/2018 |
| WO | 2019001015 A1 | 1/2019 |
| WO | 2019059676 A1 | 3/2019 |
| WO | 2019100060 A1 | 5/2019 |

OTHER PUBLICATIONS

Bross et al. "Versatile Video Coding (Draft 6)," Joint Video Experts Team (JVET) of ITU-T SG 16 WP 3 and ISO/IEC JTC 1/SC 29/WG.11 15th Meeting: Gothenburg, SE, Jul. 3-12, 2019, document JVET-O2001, vB and vE, 2019.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "Algorithm Description for Versatile Video Coding and Test Model 5 (VTM 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1002, 2019.

Hellman et al. "AHG16: Setting the Minimum CTU Size to 32×32," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0526, 2019.

Hsiang et al. "CE1.7.0.1: Signaling Maximum CU Size for BT/TT Split," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0229, 2018.

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

Wang et al. "Extended Quad-Tree Partitioning for Future Video Coding," 2019 Data Compression Conference (DCC), Mar. 29, 2019, p. 300-309.

Zhu et al. "Non-CE1:On Transform Unit Partition-Uniform Transform Unit Structure," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0145, 2018.

https://vcgit.hhi.fraunhofer.de/jvet/VVCSoftware_VTM/tags/VTM-5.0.

International Search Report and Written Opinion from International Patent Application No. PCT/CN2020/104784 dated Nov. 2, 2020 (12 pages).

International Search Report and Written Opinion from International Patent Application No. PCT/CN2020/104785 dated Oct. 27, 2020 (10 pages).

International Search Report and Written Opinion from International Patent Application No. PCT/CN2020/104786 dated Oct. 28, 2020 (14 pages).

International Search Report and Written Opinion from International Patent Application No. PCT/CN2020/104790 dated Oct. 28, 2020 (13 pages).

Non Final Office Action from U.S. Appl. No. 17/582,690 dated Jul. 20, 2022.

Non Final Office Actin from U.S. Appl. No. 17/582,739 dated Jul. 22, 2022.

Bross et al. "Versatile Video Coding (Draft 5)," Joint Video Experts Team (JVET) of ITU-T SG 16 WP 3 and ISO/IEC JTC 1/SC 29/WG 11 14th Meeitng, Geneva, CH, Mar. 19-27, 2019, document JVET-N1001, 2019.

(56) References Cited

OTHER PUBLICATIONS

Zhao et al. "CE1-Related: Prediction Mode Restriction and Implicit Transform Aplitting to enable VPDU," Joint Videp Expert Team (JVET) of ITU-T SG 16 WP 3 and ISO/IEC JTC 1/SC 29/WG 11 13th Meeting: Marrakech, MA, Jan. 9-18, 2019, document JVET-M0285, 2019.
Extended European Search Report from European Patent Application No, 20847406.4 dated Aug. 1, 2022 (8 pages).
Hsiang et al. "CE1.6.1: Coding Large Size CUs," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0227, 2018. (cited in EP20847404.9 EESR mailed Sep. 15, 2022).
Lee et al. "AHG5:Block Size Restrictipon of Intra Block Copy," Joint Collaborative Team on Video Coding (JCT-VC) of ITU-T SG 16 WP 3 and ISO/IEC JTC 1/SC 29/WG 11 15th Meeting, Geneva, CH Oct. 23-Nov. 1, 2013, document JCTVC-O0102, 2013 (cited in EP20847404.9 EESR mailed Sep. 15, 2022).
Suzuki et al. "Description of SDR and HDR Video Coding Technology Proposal by Sony," Joint Video Experts Team (JVET) of ITU-T SG 16 WP 3 and ISO/IEC JTC 1/SC 29/WG 11 10th Meeting, San Diego, US, Apr. 10-20, 2018, document JVET-J0028, 2018. (cited in EP20847404.9 EESR mailed Sep. 15, 2022).
Van Der Auwera "Description of Core Experiment 3 (CE3): Intra Prediction and Mode Coding," Joint Video Experts Team (JVET) of ITU-T SG 16 WP 3 and ISO/IEC JTC 1/SC 29/WG 11 14th Meeting, Geneva, CH Mar. 19-27, 2019. document JVET-N1023, 2019. (cited in EP20847404.9 mailed Sep. 15, 2022).
Extended European Search Report from European Patent Application No. 20847404.9 dated Sep. 15, 2022 (13 pages).

\* cited by examiner

DETERMINATION OF PICTURE PARTITION MODE BASED ON BLOCK SIZE

CROSS-REFERENCE TO RELATED APPLICATIONS

This application is a continuation of International Patent Application No. PCT/CN2020/104785, filed on Jul. 27, 2020, which claims the priority to and benefits of International Patent Application No. PCT/CN2019/097926, filed on Jul. 26, 2019 and International Patent Application No. PCT/CN2019/103892, filed on Aug. 31, 2019. All the aforementioned patent applications are hereby incorporated by reference in their entireties.

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments to performing coding or decoding of video in which the picture partition mode is determined based on block size.

In an example aspect a method of video processing is disclosed. The method includes using a dimension of a virtual pipeline data unit (VPDU) used for a conversion between a video comprising one or more video regions comprising one or more video blocks and a bitstream representation of the video to perform a determination of whether a ternary-tree (TT) or a binary tree (BT) partitioning of a video block of the one or more video blocks is enabled, and performing, based on the determination, the conversion, wherein the dimension is equal to VSize in luma samples, wherein dimensions of the video block are CtbSizeY in luma samples, wherein VSize=min(M, CtbSizeY), and wherein M is a positive integer.

In another example aspect a method of video processing is disclosed. The method includes using, for a conversion between a video comprising one or more video regions comprising one or more video blocks and a bitstream representation of the video, a dimension of a video block of the one or more video blocks to perform a determination of whether a ternary-tree (TT) or a binary-tree (BT) partitioning of the video block is enabled, and performing, based on the determination, the conversion.

In yet another example aspect a method of video processing is disclosed. The method includes using a height or a width of a video block to perform a determination of whether a coding tool is enabled for a conversion between a video comprising one or more video regions comprising one or more video blocks comprising the video block and a bitstream representation of the video, and performing, based on the determination, the conversion, wherein the determination is based on a comparison between the height or the width with a value N, where N is a positive integer.

In yet another example aspect a method of video processing is disclosed. The method includes using comparison between a height or a width of a video block and a size of a transform block to perform a determination of whether a coding tool is enabled for a conversion between a video comprising one or more video regions comprising one or more video blocks comprising the video block and a bitstream representation of the video, and performing, based on the determination, the conversion.

In yet another example aspect a method of video processing is disclosed. The method includes using a height or a width of a video block to perform a determination of whether a coding tool is enabled for a conversion between a video comprising one or more video regions comprising one or more video blocks comprising the video block and a bitstream representation of the video, and performing, based on the determination, the conversion.

In yet another example aspect a method of video processing is disclosed. The method includes using a comparison between a dimension of a sub-partition of a video block and a maximum transform size to perform (a) a determination of whether an intra sub-partition prediction (ISP) mode is enabled for a conversion between a video comprising one or more video regions comprising one or more video blocks comprising the video block, and (b) a selection of one or more allowable partition types for the conversion, and performing, based on the determination and the selection, the conversion, wherein, in the ISP mode, a video block of the one or more video blocks is partitioned into multiple sub-partitions before application of an intra-prediction and transform.

In yet another example aspect a method of video processing is disclosed. The method includes performing a conversion between a video comprising one or more video regions comprising one or more video blocks and a bitstream representation of the video, wherein the conversion comprises a coding tool that has been disabled, and wherein syntax elements related to the coding tool are excluded from the bitstream representation and inferred to be a predetermined value specifying that the coding tool is disabled.

In yet another example aspect a method of video processing is disclosed. The method includes performing a conversion between a video comprising one or more video regions comprising one or more video blocks and a bitstream representation of the video, wherein the conversion comprises a coding tool that has been disabled, and wherein the bitstream representation comprises syntax elements related to the coding tool that are inferred to be a predetermined value based on the coding tool being disabled.

In yet another example aspect a method of video processing is disclosed. The method includes using a dimension of a virtual pipeline data unit (VPDU) and/or a maximum transform size used for a conversion between a video comprising one or more video regions comprising one or more video blocks and a bitstream representation of the video to perform a determination of whether an implicit (QT) partitioning of a video block of the one or more video blocks is enabled, and performing, based on the determination, the conversion.

In yet another example aspect a method of video processing is disclosed. The method includes performing a conversion between a video comprising one or more video regions comprising one or more video blocks and a bitstream representation of the video, wherein the conversion comprises a sub-block transform (SBT), wherein a maximum height or a maximum width of the SBT is based on a maximum transform size, and wherein the SBT comprises one or more transforms being separately applied to one or more partitions of a video block of the one or more video blocks.

In yet another example aspect a method of video processing is disclosed. The method includes performing a conversion between a video comprising one or more video regions comprising one or more video blocks and a bitstream representation of the video, wherein the conversion comprises a transform skip mode and/or an intra block-based differential pulse code modulation (BDPCM) mode, wherein a maximum block size used for the transform skip mode is based on a maximum transform size, wherein the transform skip mode comprises skipping transform and inverse transform processes for a corresponding coding tool, and wherein, in the BDPCM mode, a residual of an intra prediction of the current video block is predictively coded using a differential pulse coding modulation operation.

In yet another example aspect a method of video processing is disclosed. The method includes using a comparison between a height or a width of a video block and a maximum transform size to perform a determination of whether a combined inter intra prediction (CI IP) mode is enabled for a conversion between a video comprising one or more video regions comprising one or more video blocks comprising the video block and a bitstream representation of the video, and performing, based on the determination, the conversion, wherein, in the CIIP mode, a final prediction of the video block is based on a weighted sum of an inter prediction of the video block and an intra prediction of the video block.

In yet another example aspect a method of video processing is disclosed. The method includes making a determination, for a conversion between a video comprising one or more video regions comprising one or more video blocks and a bitstream representation of the video, regarding partitioning a video block of the one or more video blocks coded with combined inter intra prediction (CIIP), and performing, based on the determination, the conversion, wherein, in the CIIP mode, a final prediction of the video block is based on a weighted sum of an inter prediction of the video block and an intra prediction of the video block.

In yet another example aspect a method of video processing is disclosed. The method includes performing a conversion between a video comprising a video region comprising multiple video blocks and a bitstream representation of the video according to a rule, wherein the rule specifies that a maximum block size of the multiple video blocks in the video region that are coded in the bitstream representation using a transform coding determines a maximum block size of the multiple video blocks in the video region that are coded in the bitstream representation without using transform coding.

In yet another example aspect a method of video processing is disclosed. The method includes performing a conversion between a video comprising a video region comprising multiple video blocks and a bitstream representation of the video according to a rule, wherein the rule specifies that a luma mapping with chroma scaling (LMCS) process is disabled for the video region when lossless coding is enabled for the video region, wherein the video region is a sequence, a picture, a subpicture, a slice, a tile group, a tile, a brick, a coding tree unit (CTU) row, a CTU, a coding unit (CU), a prediction unit (PU), a transform unit (TU), or a subblock, and wherein the LMCS process comprises luma samples of the video region being reshaped between a first domain and a second domain and a chroma residual being scaled in a luma-dependent manner.

In yet another example aspect, the above-described method may be implemented by a video encoder apparatus that comprises a processor.

In yet another example aspect, these methods may be embodied in the form of processor-executable instructions and stored on a computer-readable program medium.

These, and other, aspects are further described in the present document.

DETAILED DESCRIPTION

Figure 1:
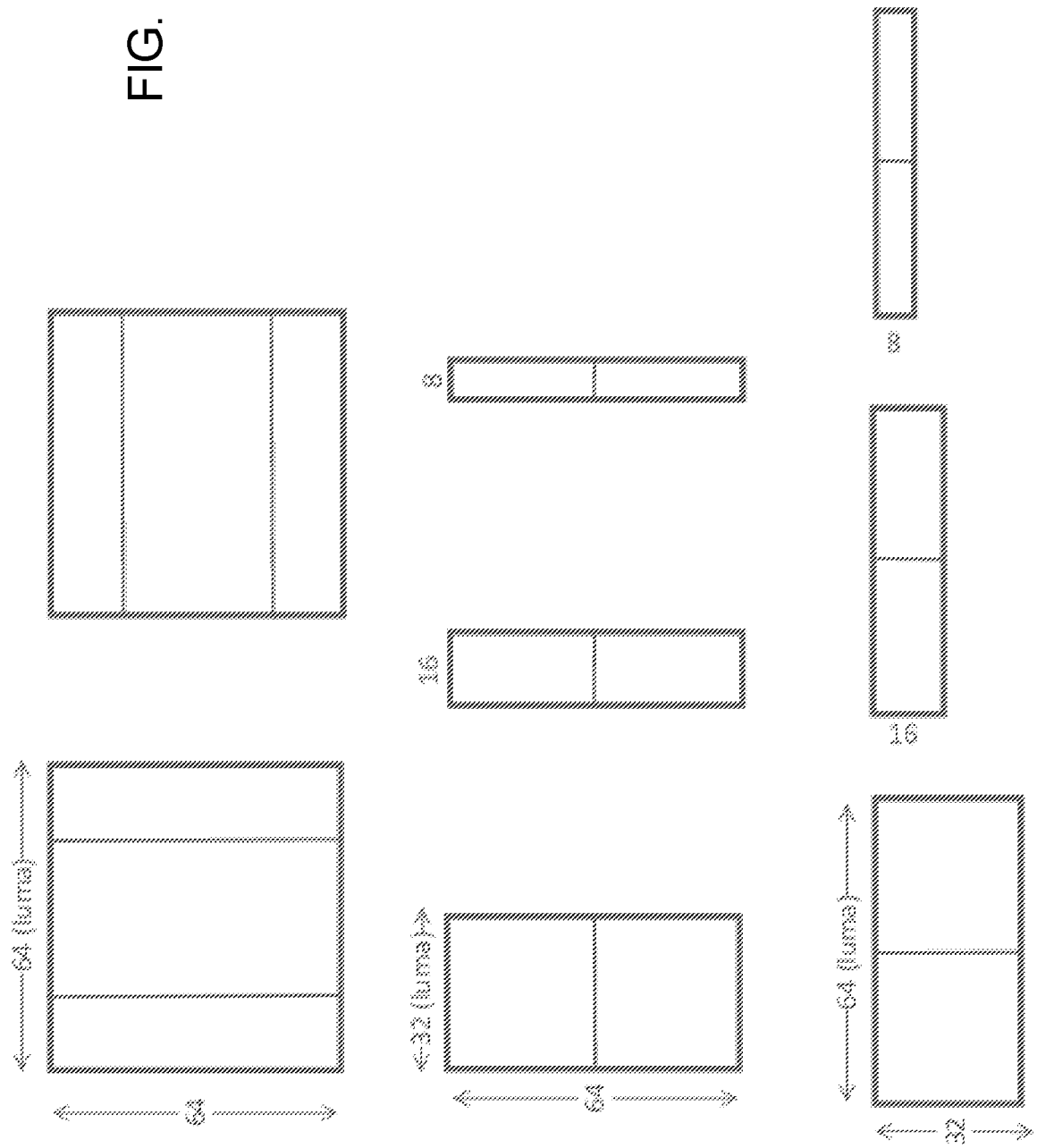
FIG. 1 shows examples of binary-tree (BT) and ternary-tree (TT) splitting depending on the video block size.

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This document is related to video coding technologies. Specifically, it is about rules for controlling size of coding tree unit or transform unit in video coding and decoding. It may be applied to the existing video coding standard like HEVC, or the standard (Versatile Video Coding) to be finalized. It may be also applicable to future video coding standards or video codec.

2. Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (WC) in the April 2018 JVET meeting, and the first version of WC test model (VTM) was released at that time. As there are continuous effort contributing to WC standardization, new coding techniques are being adopted to the WC standard in every JVET meeting. The WC working draft and test model VTM are then updated after every meeting. The WC project is now aiming for technical completion (FDIS) at the July 2020 meeting.

2.1 CTU Size in WC

VTM-5.0 software allows 4 different CTU sizes: 16×16, 32×32, 64×64 and 128×128. However, at the July 2019 JVET meeting, the minimum CTU size was redefined to 32×32 due to the adoption of JVET-O0526. And the CTU size in WC working draft 6 is encoded in the SPS header in a UE-encoded syntax element called log 2_ctu_size_minus_5.

Below are the corresponding spec modifications in WC draft 6 with the definition of Virtual pipeline data units (VPDUs) and the adoption of JVET-O0526.

7.3.2.3. Sequence parameter set RBSP syntax

| seq_parameter_set_rbsp( ) { | Descriptor |
|---|---|
| ... | |
| log2_ctu_size_minus5 | u(2) |

7.4.3.3. Sequence parameter set RBSP semantics

...

*log2_ctu_size_minus5* plus 5 specifies the luma coding tree block size of each CTU. It is a requirement of bitstream conformance that the value of log 2_ctu_size_minus5 be less than or equal to 2.

*log2_min_luma_coding_block_size_minues2* plus 2 specifies the minimum luma coding block size.

The variables Ctb Log 2SizeY, CtbSizeY, MinCb Log 2SizeY, MinCbSizeY, IbcBufWidthY, IbcBufWidthC and Vsize are derived as follows:

$$Ctb\ Log\ 2SizeY = log2\_ctu\_size\_minus5 + 5 \quad (7\text{-}15)$$

$$CtbSizeY = 1 << Ctb\ Log\ 2SizeY \quad (7\text{-}16)$$

$$MinCb\ Log\ 2SizeY = log\ 2\_min\_luma\_coding\_block\_size\_minus2 + 2 \quad (7\text{-}17)$$

$$MinCbSizeY = 1 << MinCb\ Log\ 2SizeY \quad (7\text{-}18)$$

$$IbcBufWidthY = 128*128/CtbSizeY \quad (7\text{-}19)$$

$$IbcBufWidthC = IbcBufWidthY/SubWidthC \quad (7\text{-}20)$$

$$Vsize = Min(\ 64,\ CtbSizeY\ ) \quad (7\text{-}21)$$

The variables CtbWidthC and CtbHeightC, which specify the width and height, respectively, of the array for each chroma CTB, are derived as follows:

If chroma_format_idc is equal to 0 (monochrome) or separate_colour_plane_flag is equal to 1, CtbWidthC and CtbHeightC are both equal to 0.

Otherwise, CtbWidthC and CtbHeightC are derived as follows:

$$CtbWidthC = CtbSizeY/SubWidthC \quad (7\text{-}22)$$

$$CtbHeightC = CtbSizeY/SubHeightC \quad (7\text{-}23)$$

For log 2BlockWidth ranging from 0 to 4 and for log 2BlockHeight ranging from 0 to 4, inclusive, the up-right diagonal and raster scan order array initialization process as specified in clause 6.5.2 is invoked with 1<<log 2BlockWidth and 1<<log 2BlockHeight as inputs, and the output is assigned to DiagScanOrder[log 2BlockWidth][log 2BlockHeight] and RasterScanOrder[log 2BlockWidth][log 2BlockHeight].

. . .

*slice_log2_diff_max_bt_min_qt_luma* specifies the difference between the base 2 logarithm of the maximum size (width or height) in luma samples of a luma coding block that can be split using a binary split and the minimum size (width or height) in luma samples of a luma leaf block resulting from quadtree splitting of a CTU in the current slice. The value of slice_log 2_diff_max_bt_min_qt_luma shall be in the range of 0 to Ctb Log 2SizeY−MinQt Log 2SizeY, inclusive. When not present, the value of slice_log 2_diff_max_bt_min_qt_luma is inferred as follows:

If slice_type equal to 2 (I), the value of slice_log 2_diff_max_bt_min_qt_luma is inferred to be equal to sps_log 2_diff_max_bt_min_qt_intra_slice_luma Otherwise (slice type equal to 0 (B) or 1 (P)), the value of slice_log 2_diff_max_bt_min_qt_luma is inferred to be equal to sps_log 2_diff_max_bt_min_qt_inter_slice.

*slice_log2_diff_max_tt_min_qt_luma* specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in in the current slice. The value of slice_log 2_diff_max_tt_min_qt_luma shall be in the range of 0 to Ctb Log 2SizeY−MinQt Log 2SizeY, inclusive. When not present, the value of slice_log 2_diff_max_tt_min_qt_luma is inferred as follows:

If slice type equal to 2 (I), the value of slice_log 2_diff_max_tt_min_qt_luma is inferred to be equal to sps_log 2_diff_max_tt_min_qt_intra_slice_luma Otherwise (slice_type equal to 0 (B) or 1 (P)), the value of slice_log 2_diff_max_tt_min_qt_luma is inferred to be equal to sps_log 2_diff_max_tt_min_qt_inter_slice.

*slice_log2_diff_min_qt_min_cb_chroma* specifies the difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in the current slice. The value of slice_log 2_diff_min_qt_min_cb_chroma shall be in the range of 0 to Ctb Log 2SizeY−MinCb Log 2SizeY, inclusive. When not present, the value of slice_log 2_diff_min_qt_min_cb_chroma is inferred to be equal to sps_log 2_diff_min_qt_min_cb_intra_slice_chroma.

*slice_max_mtt_hierarchy_depth_chroma* specifies the maximum hierarchy depth for coding units resulting from multi-type tree splitting of a quadtree leaf with treeType equal to DUAL_TREE_CHROMA in the current slice. The value of slice_max_mtt_hierarchy_depth_chroma shall be in the range of 0 to Ctb Log 2SizeY−MinCb Log 2SizeY, inclusive. When not present, the values of slice_max_mtt_hierarchy_depth_chroma is inferred to be equal to sps_max_mtt_hierarchy_depth_intra_slices_chroma.

*slice_log2_diff_max_bt_min_qt_chroma* specifies the difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in the current slice. The value of slice_log 2_diff_max_bt_min_qt_chroma shall be in the range of 0 to Ctb Log 2SizeY−MinQt Log 2SizeC, inclusive. When not present, the value of slice_log 2_diff_max_bt_min_qt_chroma is inferred to be equal to sps_log 2_diff_max_bt_min_qt_intro_slice_chroma

*slice_log2_diff_max_tt_min_qt_chroma* specifies the difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in the current slice. The value of slice_log 2_diff_max_tt_min_qt_chroma shall be in the range of 0 to Ctb Log 2SizeY−MinQt Log 2SizeC, inclusive. When not present, the value of slice_log 2_diff_max_tt_min_qt_chroma is inferred to be equal to sps_log 2_diff_max_tt_min_qt_intro_slice_chroma The variables MinQt Log 2SizeY, MinQt Log 2SizeC, MinQtSizeY, MinQtSizeC, MaxBtSizeY, MaxBtSizeC, MinBtSizeY, MaxTtSizeY, MaxTtSizeC, MinTtSizeY, MaxMttDepthY and MaxMttDepthC are derived as follows:

$$\text{MinQt Log 2SizeY=MinCb Log 2SizeY+slice\_log 2\_diff\_min\_}qt\_min\_cb\_\text{luma} \quad (7\text{-}86)$$

$$\text{MinQt Log 2SizeC=MinCb Log 2SizeY+slice\_log 2\_diff\_min\_}qt\_min\_cb\_\text{chroma} \quad (7\text{-}87)$$

$$\text{MinQtSizeY=1<<MinQt Log 2SizeY} \quad (7\text{-}88)$$

$$\text{MinQtSizeC=1<<MinQt Log 2SizeC} \quad (7\text{-}89)$$

$$\text{MaxBtSizeY=1<<(MinQt Log 2SizeY+slice\_log 2\_diff\_max\_}bt\_min\_qt\_\text{luma}) \quad (7\text{-}90)$$

$$\text{MaxBtSizeC=1<<(MinQt Log 2SizeC+slice\_log 2\_diff\_max\_}bt\_min\_qt\_\text{chroma}) \quad (7\text{-}91)$$

$$\text{MinBtSizeY=1<<MinCb Log 2SizeY} \quad (7\text{-}92)$$

$$\text{MaxTtSizeY=1<<(MinQt Log 2SizeY+slice\_log 2\_diff\_max\_}tt\_min\_qt\_\text{luma}) \quad (7\text{-}93)$$

$$\text{MaxTtSizeC=1<<(MinQt Log 2SizeC+slice\_log 2\_diff\_max\_}tt\_min\_qt\_\text{chroma}) \quad (7\text{-}94)$$

$$\text{MinTtSizeY=1<<MinCb Log 2SizeY} \quad (7\text{-}95)$$

$$\text{MaxMttDepthY=slice\_max\_}mtt\_\text{hierarchy\_depth\_luma} \quad (7\text{-}96)$$

$$\text{MaxMttDepthC=slice\_max\_}mtt\_\text{hierarchy\_depth\_chroma} \quad (7\text{-}97)$$

2.2 Maximum Transform Size in WC

In WC Draft 5, the max transform size is signalled in the SPS but it is fixed as 64-length and not configurable. However, at the July 2019 JVET meeting, it was decided to enable the max luma transform size to be either 64 or 32 only with a flag at the SPS level. Max chroma transform size is derived from the chroma sampling ratio relative to the max luma transform size.

Below are the corresponding spec modifications in WC draft 6 with the adoption of JVET-O05xxx.

7.3.2.3. Sequence parameter set RBSP syntax

| seq_parameter_set_rbsp( ) { | Descriptor |
|---|---|
| ... | |
| *sps_max_luma_transform_size_64_flag* | *u(1)* |
| ... | |

7.4.3.3. Sequence parameter set RBSP semantics

...

*sps_max_luma_transform_ size_64_flag equal to 1 specifies that the maximum transform size in luma samples is equal to 64. sps_ max_luma_transform_ size_64_flag equal to 0 specifies that the maximum transform size in luma samples is equal to 32. When CtbSizeY is less than 64, the value of sps_ max_luma_transform_ size_64_flag shall be equal to 0.*

The variables MinTb Log 2SizeY, MaxTb Log 2SizeY, MinTbSizeY, and MaxTbSizeY are derived as follows:

$$\text{MinTb Log 2SizeY=2} \quad (7\text{-}27)$$

$$\text{MaxTb Log 2SizeY=}\textbf{\textit{sps\_max\_luma\_transform\_ size\_64\_flag ? 6 : 5}} \quad (7\text{-}28)$$

$$\text{MinTbSizeY=1<<MinTb Log 2SizeY} \quad (7\text{-}29)$$

$$\text{MaxTbSizeY=1<<MaxTb Log 2SizeY} \quad (7\text{-}30)$$

...

*sps_sbt_max_size_64_flag* equal to 0 specifies that the maximum CUwidth and height for allowing subblock transform is 32 luma samples. sps_sbt_max_size_64_flag equal to 1 specifies that the maximum CU width and height for allowing subblock transform is 64 luma samples.

$$\text{MaxSbtSize=Min(MaxTbSizeY,}\textbf{\textit{sps\_sbt\_max\_size\_ 64\_flag ? 64 : 32}}) \quad (7\text{-}31)$$

...

3. Examples of Technical Problems Addressed by the Disclosed Technical Solutions There are several problems in the latest WC working draft JVET-O2001-v11, which are described below.

1) In current WC draft 6, the maximum transform size and CTU size are defined independently. E.g., CTU size could be 32, whereas transform size could be 64. It is desirable that the maximum transform size should be equal or smaller than the CTU size.

2) In current WC draft 6, the block partition process depends on the maximum transform block size other than the VPDU size. Therefore, if the maximum transform block size is 32×32, in addition to prohibit 128×128 TT split and 64×128 vertical BT split, and 128×64 horizontal BT split to obey the VPDU rule, it further prohibits TT split for 64×64 block, prohibits vertical BT split for 32×64/16×64/8×64 coding block, and also prohibits horizontal BT split for 64×8/64×16/64×32 coding block, which may not efficient for coding efficiency.

3) Current WC draft 6 allows CTU size equal to 32, 64, and 128. However, it is possible that the CTU size could be larger than 128. Thus some syntax elements need to be modified.
   a) If larger CTU size is allowed, the block partition structure and the signaling of block split flags may be redesigned.
   b) If larger CTU size is allowed, then some of the current design (e.g., affine parameters derivation, IBC prediction, IBC buffer size, merge triangle prediction, CIIP, regular merge mode, and etc.) may be redesigned.

4) In current WC draft 6, the CTU size is signaled at SPS level. However, since the adoption of reference picture resampling (a.k.a. adaptive resolution change) allows that the pictures could be coded with difference resolutions in one bitstream, the CTU size may be different across multiple layers.

5) In WD6, the maximum block size used for MIP and ISP are dependent on the maximum transform size, other than the VPDU size or 64×64, which may not efficient for coding efficiency.

6) In WD6, the maximum block size used for transform skip and intra BDPCM are dependent on the maximum transform skip size, which is restrict by the maximum transform size.

7) In WD6, the maximum block size used for SBT are dependent on the maximum SBT size, which is restrict by the maximum transform size.

8) In WD6, the size of coding block used for IBC and PLT are limited to 64×64, which may be adjusted by maximum transform size, CTU size, and/or VPDU size.

9) In WD6, the size of coding block used for CIIP could be larger than maximum transform size.

10) In WD6, the LMCS enabled flag is not conditioned by transform quantization bypass flag.

4. Example Embodiments and Techniques

The listing of solutions below should be considered as examples to explain some concepts. These items should not be interpreted in a narrow way. Furthermore, these items can be combined in any manner.

In this document, C=min(a,b) indicates that the C is equal to the minimum value between a and b.

In this document, the video unit size/dimension may be either the height or width of a video unit (e.g., width or height of a picture/sub-picture/slice/brick/tile/CTU/CU/CB/TU/TB). If a video unit size is denoted by M×N, then M denotes the width and N denotes the height of the video unit.

In this document, "a coding block" may be a luma coding block, and/or a chroma coding block. The size/dimension in luma samples for a coding block may be used in this invention to represent the size/dimension measured in luma samples. For example, a 128×128 coding block (or a coding block size 128×128 in luma samples) may indicate a 128×128 luma coding block, and/or a 64×64 chroma coding block for 4:2:0 color format. Similarly, for 4:2:2 color format, it may refer to a 128×128 luma coding block and/or a 64×128 chroma coding block. For 4:4:4 color format, it may refer to a 128×128 luma coding block and/or a 128×128 chroma coding block.

Configurable CTU Size Related

1. It is proposed that different CTU dimensions (such as width and/or height) may be allowed for different video units such as Layers/Pictures/Subpictures/Slices/Tiles/Bricks.
   a) In one example, one or multiple sets of CTU dimensions may be explicitly signaled at a video unit level such as VPS/DPS/SPS/PPS/APS/Picture/Subpicture/Slice/Slice header/Tile/Brick level.
   b) In one example, when the reference picture resampling (a.k.a. Adaptive Resolution Change) is allowed, the CTU dimensions may be different across difference layers.
      i. For example, the CTU dimensions of an inter-layer picture may be implicitly derived according to the downsample/upsample scaling factor.
         1. For example, if the signaled CTU dimensions for a base layer is M×N (such as M=128 and N=128) and the inter-layer coded picture is resembled by a scaling factor S in width and a scaling factor T in height, which may be larger or smaller than 1 (such as S=¼ and T=½ denoting the inter-layer coded picture is downsampled by 4 times in width and downsampled by 2 times in height), then the CTU dimensions in the inter-layer coded picture may be derived to (M×S)×(N×T), or (M/S)×(N/T).
      ii. For example, different CTU dimensions may be explicitly signalled for multiple layers at video unit level, e.g., for inter-layer resampling pictures/subpictures, the CTU dimensions may be signaled at VPS/DPS/SPS/PPS/APS/picture/subpicture/Slice/Slice header/Tile/Brick level which is different from the base-layer CTU size.

2. It is proposed that whether TT or BT split is allowed or not may be dependent on VPDU dimensions (such as width and/or height). Suppose VPDU is with dimension VSize in luma samples, and the coding tree block is with dimension CtbSizeY in luma samples.
   a) In one example, VSize=min(M, CtbSizeY). M is an integer value such as 64.
   b) In one example, whether TT or BT split is allowed or not may be independent of the maximum transform size.
   c) In one example, TT split may be disabled when a coding block width or height in luma samples is greater than min(VSize, maxTtSize).
      i. In one example, when maximum transform size is equal to 32×32 but VSize is equal to 64×64, TT split may be disabled for 128×128/128×64/64×128 coding block.
      ii. In one example, when maximum transform size is equal to 32×32 but VSize is equal to 64×64, TT split may be allowed for 64×64 coding block.
   d) In one example, vertical BT split may be disabled when a coding block width in luma samples is less than or equal to VSize, but its height in luma samples is greater than VSize.
      i. In one example, in case of maximum transform size 32×32 but VPDU size equal to 64×64, vertical BT split may be disabled for 64×128 coding block.

ii. In one example, in case of maximum transform size 32×32 but VPDU size equal to 64×64, vertical BT split may be allowed for 32×64/16×64/8×64 coding block.
e) In one example, vertical BT split may be disabled when a coding block exceeds the Picture/Subpicture width in luma samples, but its height in luma samples is greater than VSize.
  i. Alternatively, horizontal BT split may be allowed when a coding block exceeds the Picture/Subpicture width in luma samples.
f) In one example, horizontal BT split may be disabled when a coding block width in luma samples is greater than VSize, but its height in luma samples is less than or equal to VSize.
  i. In one example, in case of maximum transform size 32×32 but VPDU size equal to 64×64, vertical BT split may be disabled for 128×64 coding block.
  ii. In one example, in case of maximum transform size 32×32 but VPDU size equal to 64×64, horizontal BT split may be allowed for 64×8/64×16/64×32 coding block.
g) In one example, horizontal BT split may be disabled when a coding block exceeds the Picture/Subpicture height in luma samples, but its width in luma samples is greater than VSize.
  i. Alternatively, vertical BT split may be allowed when a coding block exceeds the Picture/Subpicture height in luma samples.
h) In one example, when TT or BT split is disabled, the TT or BT split flag may be not signaled and implicitly derived to be zero.
  i. Alternatively, when TT and/or BT split is enabled, the TT and/or BT split flag may be explicitly signaled in the bitstream.
  ii. Alternatively, when TT or BT split is disabled, the TT or BT split flag may be signaled but ignored by the decoder.
  iii. Alternatively, when TT or BT split is disabled, the TT or BT split flag may be signaled but it must be zero in a conformance bitstream.

3. It is proposed that the CTU dimensions (such as width and/or height) may be larger than 128.
  a) In one example, the signaled CTU dimensions may be 256 or even larger (e.g., log 2_ctu_size_minus5 may be equal to 3 or larger).
  b) In one example, the derived CTU dimensions may be 256 or even larger.
    i. For example, the derived CTU dimensions for resampling pictures/subpictures may be larger than 128.

4. It is proposed that when larger CTU dimensions is allowed (such as CTU width and/or height is larger than 128), then the QT split flag may be inferred to be true and the QT split may be recursively applied till the dimension of split coding block reach a specified value (e.g., a specified value may be set to the maximum transform block size, or 128, or 64, or 32).
  a) In one example, the recursive QT split may be implicitly conducted without signaling, until the split coding block size reach the maximum transform block size.
  b) In one example, when CTU 256×256 is applied to dual tree, then the QT split flag may be not signalled for a coding block larger than maximum transform block size, and the QT split may be forced to be used for the coding block until the split coding block size reach the maximum transform block size.

5. It is proposed that TT split flag may be conditionally signalled for CU/PU dimensions (width and/or height) larger than 128.
  a) In one example, both horizontal and vertical TT split flags may be signalled for a 256×256 CU.
  b) In one example, vertical TT split but not horizontal TT split may be signalled for a 256×128/256×64 CU/PU.
  c) In one example, horizontal TT split but not vertical TT split may be signalled for a 128×256/64×256 CU/PU.
  d) In one example, when TT split flag is prohibited for CU dimensions larger than 128, then it may not be signalled and implicitly derived as zero.
    i. In one example, horizontal TT split may be prohibited for 256×128/256×64 CU/PU.
    ii. In one example, vertical TT split may be prohibited for 128×256/64×256 CU/PU.

6. It is proposed that BT split flag may be conditionally signalled for CU/PU dimensions (width and/or height) larger than 128.
  a) In one example, both horizontal and vertical BT split flags may be signalled for 256×256/256×128/128×256 CU/PU.
  b) In one example, horizontal BT split flag may be signaled for 64×256 CU/PU.
  c) In one example, vertical BT split flag may be signaled for 256×64 CU/PU.
  d) In one example, when BT split flag is prohibited for CU dimension larger than 128, then it may be not signalled and implicitly derived as zero.
    i. In one example, vertical BT split may be prohibited for K×256 CU/PU (such as K is equal to or smaller than 64 in luma samples), and the vertical BT split flag may be not signaled and derived as zero.
      1. For example, in the above case, vertical BT split may be prohibited for 64×256 CU/PU.
      2. For example, in the above case, vertical BT split may be prohibited to avoid 32×256 CU/PU at picture/subpicture boundaries.
    ii. In one example, vertical BT split may be prohibited when a coding block exceeds the Picture/Subpicture width in luma samples, but its height in luma samples is greater than M (such as M=64 in luma samples).
    iii. In one example, horizontal BT split may be prohibited for 256×K (such as K is equal to or smaller than 64 in luma samples) coding block, and the horizontal BT split flag may be not signaled and derived as zero.
      1. For example, in the above case, horizontal BT split may be prohibited for 256×64 coding block.
      2. For example, in the above case, horizontal BT split may be prohibited to avoid 256×32 coding block at picture/subpicture boundaries.
    iv. In one example, horizontal BT split may be prohibited when a coding block exceeds the Picture/Subpicture height in luma samples, but its width in luma samples is greater than M (such as M=64 in luma samples).

7. It is proposed that the affine model parameters calculation may be dependent on the CTU dimensions.
  a) In one example, the derivation of scaled motion vectors, and/or control point motion vectors in affine prediction may be dependent on the CTU dimensions.

8. It is proposed that the intra block copy (IBC) buffer may depend on the maximum configurable/allowable CTU dimensions.

a) For example, the IBC buffer width in luma samples may be equal to N×N divided by CTU width (or height) in luma samples, wherein N may be the maximum configurable CTU size in luma samples, such as N=1<< (log 2_ctu_size_minus5+5).
9. It is proposed that a set of specified coding tool(s) may be disabled for a large CU/PU, where the large CU/PU refers to a CU/PU where either the CU/PU width or CU/PU height is larger than N (such as N=64 or 128).
  a) In one example, the above-mentioned specified coding tool(s) may be palette, and/or intra block copy (IBC), and/or intra skip mode, and/or triangle prediction mode, and/or CIIP mode, and/or regular merge mode, and/or decoder side motion derivation, and/or bi-directional optical flow, and/or prediction refinement based optical flow, and/or affine prediction, and/or sub-block based TMVP, and etc.
    i. Alternatively, screen content coding tool(s) such as palette and/or intra block copy (IBC) mode may be applied to large CU/PU.
  b) In one example, it may explicitly use syntax constraint for disabling the specified coding tool(s) for a large CU/PU.
    i. For example, Palette/IBC flag may explicitly signal for a CU/PU which is nota large CU/PU.
  c) In one example it may use bitstream constraint for disabling specified coding tool(s) for a large CU/PU.
10. Whether TT or BT split is allowed or not may be dependent on the block dimensions.
  a) In one example, TT split may be disabled when a coding block width or height in luma samples is greater than N (e.g., N=64).
    i. In one example, when maximum transform size is equal to 32×32, TT split may be disabled for 128×128/128×64/64×128 coding block.
    ii. In one example, when maximum transform size is equal to 32×32, TT split may be allowed for 64×64 coding block.
  b) In one example, vertical BT split may be disabled when a coding block width in luma samples is less than or equal to N (e.g., N=64), but its height in luma samples is greater than N (e.g., N=64).
    i. In one example, in case of maximum transform size 32×32, vertical BT split may be disabled for 64×128 coding block.
    ii. In one example, in case of maximum transform size 32×32, vertical BT split may be allowed for 32×64/16×64/8×64 coding block.
  c) In one example, vertical BT split may be disabled when a coding block exceeds the Picture/Subpicture width in luma samples, but its height in luma samples is greater than 64.
    i. Alternatively, horizontal BT split may be allowed when a coding block exceeds the Picture/Subpicture width in luma samples.
  d) In one example, horizontal BT split may be disabled when a coding block width in luma samples is greater than N (e.g., N=64), but its height in luma samples is less than or equal to N (e.g., N=64).
    i. In one example, in case of maximum transform size 32×32, vertical BT split may be disabled for 128×64 coding block.
    ii. In one example, in case of maximum transform size 32×32, horizontal BT split may be allowed for 64×8/64×16/64×32 coding block.
  e) In one example, horizontal BT split may be disabled when a coding block exceeds the Picture/Subpicture height in luma samples, but its width in luma samples is greater than N (e.g., N=64).
    i. Alternatively, vertical BT split may be allowed when a coding block exceeds the Picture/Subpicture height in luma samples.

Configurable Maximum Transform Size Related
11. It is proposed that the maximum TU size may be dependent on CTU dimensions (width and/or height), or CTU dimensions may be dependent on the maximum TU size
  a) In one example, a bitstream constraint may be used that the maximum TU size shall be smaller or equal to the CTU dimensions.
  b) In one example, the signaling of maximum TU size may depend on the CTU dimensions.
    i. For example, when the CTU dimensions are smaller than N (e.g. N=64), the signaled maximum TU size must be smaller than N.
    ii. For example, when the CTU dimensions are smaller than N (e.g. N=64), the indication of whether the maximum luma transform size is 64 or 32 (e.g., sps_max_luma_transform_size_64_flag) may not be signaled and the maximum luma transform size may be derived as 32 implicitly.
12. A certain coding tool may be enabled for a block with width and/or height greater than the transform block size.
  a) In one example, the certain coding tool may be the intra sub-partition prediction (ISP), MIP, SBT or other coding tools that may split one CU into multiple TUs or one CB to multiple TBs.
  b) In one example, the certain coding tool may be a coding tool which doesn't apply transform (or only identity transform is applied), such as Transform Skip mode, BDPCM/DPCM/PCM.
  c) The certain tool may be Intra Block Copy (IBC), Palette (PLT).
  d) The certain tool may be combined inter intra prediction (CIIP).
13. Whether a certain coding tool is enabled or not may be dependent on the coding block dimensions.
  a) In one example, the certain coding tool may be the intra sub-partition prediction (ISP), matrixed based intra prediction (MIP), Sub-block transform (SBT), Intra Block Copy (IBC), Palette (PLT), and etc.
  b) In one example, the certain coding tool (such as ISP, MIP) may be allowed when a coding block width and/or height in luma samples are smaller than or equal to N (e.g., N=64).
    i. Alternatively, the certain coding tool may be disabled when a coding block width and/or height in luma samples is greater than N (e.g., N=64).
  c) Whether the certain coding tool (such as ISP, MIP) is enabled or not may be dependent on the relationship between the coding block size and VPDU size.
    i. In one example, the certain coding tool may be allowed when a coding block width and/or height in luma samples are smaller than or equal to the VPDU size (such as 32 or 64).
      1. Alternatively, the certain coding tool may be disabled when a coding block width and/or height in luma samples is greater than the VPDU size (such as 32 or 64).
  d) Whether the intra sub-partition prediction (ISP) is enabled or not and/or which partition type(s) (e.g., splitting direction) is (are) allowed may be dependent on the relationship between the sub-partition's dimensions and maximum transform block size.

i. In one example, if the sub-partition width and/or height is no greater than the maximum transform block size for at least one partition type, ISP may be enabled.
   1. Alternatively, furthermore, otherwise, IPS may be disabled.
ii. In one example, if the sub-partition width and/or height is no greater than the maximum transform block size for all allowed partition types, ISP may be enabled.
   1. Alternatively, furthermore, otherwise, ISP may be disabled.
iii. In one example, the signaling of partition type (e.g., intra_subpartitions_split_flag) may depend on the relationship between the corresponding sub-partition's width and/or height based on the partition type and maximum transform block size.
   1. In one example, if only one partition type satisfies the condition that the corresponding sub-partition's width and/or height based on the partition type is no greater than the maximum transform block size, the partition type may be not signalled and inferred.
e) Whether the certain coding tool (such as IBC, PLT) is enabled or not may be dependent on the relationship between the coding block size and maximum transform size (such as 32 or 64).
   i. In one example, whether the certain coding tool (such as IBC, PLT) is enabled or not may be NOT conditioned on the relationship between the coding block dimension and a fixed number 64.
   ii. In one example, the certain coding tool (such as IBC, PLT) may be allowed when a coding block width and height in luma samples are NO greater than the maximum transform size.
      1. In one example, the certain coding tool (such as IBC, PLT) may be disabled when the block width and/or height in luma samples is greater than the maximum transform size.
      2. In one example, when the maximum transform size is equal to 32, the certain coding tool (such as IBC, PLT) may be disabled when the block width and/or height in luma samples is equal to 64.
f) If the certain coding tool is disabled, the related syntax elements (such as intra_subpartitions_mode_flag and intra_subpartitions_split_flag for ISP, intra_mip_flag and intra_mip_mode for MIP, pred_mode_ibc_flag for IBC, pred_mode_plt_flag for PLT) may be not signaled and inferred to be 0.
g) If the certain coding tool is disabled, the related syntax elements (such as intra_subpartitions_mode_flag and intra_subpartitions_split_flag for ISP, intra_mip_flag and intra_mip_mode for MIP, pred_mode_ibc_flag for IBC, pred_mode_plt_flag for PLT) may be signaled but must be 0 in a conformance bitstream.

14. The implicit QT split may be dependent on the VPDU size and/or maximum transform size.
   a) In one example, the implicit QT split may be NOT conditioned on the relationship between the coding block dimension and a fixed number 64.
   b) In one example, a coding block may be implicitly split into quad-partitions, and each sub-partition may be recursively implicit split until both width and height of the sub-partition reaches the VPDU size.
   c) In one example, a coding block may be implicitly split into quad-partitions, and each sub-partition may be recursively implicitly split until both width and height of the sub-partition reaches the maximum transform size.

15. The maximum block width and/or height used for sub-block transform (SBT) may be dependent on the maximum transform size.
   a) In one example, the maximum SBT size may be set equal to the maximum transform size.
   b) In one example, the syntax element (such as sps_sbt_max_size_64_flag) related to maximum SBT size may be not signalled.
      i. For example, sps_sbt_max_size_64_flag is not signaled and inferred to be 0 when the maximum transform size is smaller than 64.
      ii. For example, sps_sbt_max_size_64_flag is signaled when the maximum transform size is smaller than 64, but it must be equal to 0 in a conformance bitstream.
   c) In one example, signaling of the related syntax element (such as cu_sbt_flag) may be dependent on the maximum transform size.
   d) In one example, signaling of the related syntax element (such as cu_sbt_flag) may be independent on the maximum SBT size.

16. The maximum block size used for transform skip and/or intra BDPCM may be dependent on the maximum transform size.
   a) In one example, the maximum transform skip size may be set equal to maximum transform size.
   b) In one example, the syntax element (such as log 2_transform_skip_max_size_minus2) related to maximum transform skip size may be not signalled.

17. The maximum block size used for intra BDPCM may be independently signaled.
   a) In one example, the maximum block size used for intra BDPCM may be not dependent on the maximum block size used for transform skip.
   b) In one example, a SPS/VPS/PPS/Slice/VPDU/CTU/CU level flag may be signaled in the bitstream for specifying the maximum block size used for intra BDPCM.

18. Whether to enable or disable combined inter intra prediction (CIIP) for a block may depend on the relationship between the block width and/or height and the maximum transform size.
   a) In one example, CIIP may be disabled for a block if a block width and/or height greater than the maximum transform size.
   b) In one example, the syntax element to indicate CIIP (such as a ciip_flag) may not be signaled if CIIP is disabled.

19. When both width and height of a CU coded with CIIP are smaller than 128, it is not allowed to split a CU into several sub-partitions, wherein the intra-prediction for a first sub-partition may depend on the reconstruction of a second sub-partition, on which the intra-prediction is performed before that on the first sub-partition.

20. It is allowed to split a CU coded with CIIP into several sub-partitions, wherein the intra-prediction for a first sub-partition may depend on the reconstruction of a second sub-partition, on which the intra-prediction is performed before that on the first sub-partition.

Lossless Coding Related

21. Maximum size for transform skip coded blocks (i.e., no transform applied/only identity transform is applied) is derived from the maximum size for transform applied blocks (e.g., MaxTbSizeY).

a) In one example, Maximum size for transform skip coded blocks is inferred to MaxTbSizeY.
b) In one example, signaling of Maximum size for transform skip coded blocks is skipped.

22. When lossless coding is enabled, the Luma Mapping Chroma Scaling (LMCS) may be disabled for the current video unit in sequence/picture/subpicture/slice/tile group/tile/brick/CTU row/CTU/CU/PU/TU/subblock level.
   a) In one example, the LMCS enabled flag (such as sps_lmcs_enabled_flag, slice_lmcs_enabled_flag, slice_chroma_residual_scale_flag, lmcs_data, and etc.) may be signaled conditioning on the transform quantization bypass flag (such as sps_transquant_bypass_flag, pps_transquant_bypass_flag, cu_transquant_bypass_flag) in sequence/picture/subpicture/slice/tile group/tile/brick/CTU row/CTU/CU/PU/TU/subblock level.
      i. In one example, if the transform quantization bypass flag is equal to 1, the LMCS enabled flag may be not signaled and inferred to be 0.
         1. In one example, if the sequence level transform quantization bypass flag (such as sps_transquant_bypass_flag) is equal to 1, the sequence and below level LMCS enabled flag (such as sps_lmcs_enabled_flag, slice_lmcs_enabled_flag, slice_chroma_residual_scale_flag) may be not signaled and inferred to be 0.
         2. In one example, if the sequence level TransquantBypassEnabledFlag is equal to 1, the APS level lmcs_data may be not signaled.
         3. In one example, if the PPS level transform quantization bypass flag (such as pps_transquant_bypass_flag) is equal to 1, the slice level LMCS enabled flag (such as slice_lmcs_enabled_flag, slice_chroma_residual_scale_flag) may be not signaled and inferred to be 0.
   b) In one example, a bitstream constraint may be applied that the LMCS enabled flag should be equal to 0 when the transform quantization bypass flag is equal to 1.

5. Embodiments

Newly added parts are enclosed in bolded double parentheses, e.g., {{a}} denotes that "a" has been added, whereas the deleted parts from WC working draft are enclosed in bolded double brackets, e.g., [[b]] denotes that "b" has been deleted. The modifications are based on the latest WC working draft (JVET-O2001-v11).

5.1 An Example Embodiment #1
The embodiment below is for the invented method that making the maximum TU size dependent on the CTU size.
7.4.3.3. Sequence Parameter Set RBSP Semantics
. . .

*sps_max_luma_transform_size_64_flag* equal to 1 specifies that the maximum transform size in luma samples is equal to 64. sps_max_luma_transform_size_64_flag equal to 0 specifies that the maximum transform size in luma samples is equal to 32.
When CtbSizeY is less than 64, the value of sps_max_luma_transform_size_64_flag shall be equal to 0. The variables MinTb Log 2SizeY, MaxTb Log 2SizeY, MinTbSizeY, and MaxTbSizeY are derived as follows:

$$\text{MinTb Log 2SizeY}=2 \tag{7-27}$$

$$\text{MaxTb Log 2SizeY}=sps\_max\_luma\_transform\_size\_64\_flag?6:5 \tag{7-28}$$

$$\text{MinTbSizeY}=1<<\text{MinTb Log 2SizeY} \tag{7-29}$$

$$\text{MaxTbSizeY}=\{\{\min(\text{CtbSizeY},1<<\text{MaxTb Log 2SizeY})\}\} \tag{7-30}$$

. . .

5.2 an Example Embodiment #2
The embodiment below is for the invented method that making the TT and BT split process dependent on the VPDU size.

*6.4.2 Allowed binary split process*
The variable allowBtSplit is derived as follows:
. . .
   Otherwise, if all of the following conditions are true, allowBtSplit is set equal to FALSE
      btSplit is equal to SPLIT_BT_VER
      cbHeight is greater than [[MaxTbSizeY]] {{VSize}}
      x0+ cbWidth is greater than pic width in luma samples
   Otherwise, if all of the following conditions are true, allowBtSplit is set equal to FALSE
      btSplit is equal to SPLIT_BT_HOR
      cbWidth is greater than [[MaxTbSizeY]] {{VSize}}
      y0+ cbHeight is greater than pic_height_in_luma_samples
   Otherwise if all of the following conditions are true, allowBtSplit is set equal to FALSE
      btSplit is equal to SPLIT_BT_VER
      cbWidth is less than or equal to [[MaxTbSizeY]] {{VSize}}
      cbHeight is greater than [[MaxTbSizeY]] {{VSize}}
   Otherwise if all of the following conditions are true, allowBtSplit is set equal to FALSE
      btSplit is equal to SPLIT_BT_HOR
      cbWidth is greater than [[MaxTbSizeY]] {{VSize}}
      cbHeight is less than or equal to [[MaxTbSizeY]] {{VSize}}

*6.4.3 Allowed ternary split process*
. . .
The variable allowTtSplit is derived as follows:
   If one or more of the following conditions are true, allowTtSplit is set equal to FALSE:
      cbSize is less than or equal to 2*MinTtSizeY
      cbWidth is greater than Min([[MaxTbSizeY]] {{VSize}}, maxTtSize)
      cbHeight is greater than Min([[MaxTbSizeY]] {{VSize}}, maxTtSize)
      mttDepth is greater than or equal to maxMttDepth
      x0+ cbWidth is greater than pic_width_in_luma_samples
      y0+ cbHeight is greater than pic_height_in_luma_samples
      treeType is equal to DUAL_TREE_CHROMA and (cbWidth/SubWidthC)*(cbHeight/SubHeightC) is less than or equal to 32
      treeType is equal to DUAL_TREE_CHROMA and modeType is equal to INTRA
   Otherwise, allowTtSplit is set equal to TRUE.

5.3 an Example Embodiment #3
The embodiment below is for the invented method that making the affine model parameters calculation dependent on the CTU size.
7.4.3.3. Sequence Parameter Set RBSP Semantics
. . .

*log2_ctu_size_minus5* plus 5 specifies the luma coding tree block size of each CTU. It is a requirement of bitstream conformance that the value of log 2_ctu_size_minus5 be less than or equal to [[2]] {{3 (could be larger per specified)}}.
. . .

Ctb Log 2SizeY=log 2_ctu_size_minus5+5
{{Ctb Log 2SizeY is used to indicate the CTU size in luma samples of current video unit. When a single CTU size is used for the current video unit, the Ctb Log 2SizeY is calculated by above equation. Otherwise, Ctb Log 2SizeY may depend on the actual CTU size which may be explicit signalled or implicit derived for the current video unit. (an example)}}
...

8.5.5.5 Derivation process for luma affine control point motion vectors from a neighbouring block
...

The variables mvScaleHor, mvScaleVer, dHorX and dVerX are derived as follows:
    If isCTUboundary is equal to TRUE, the following applies:

mvScaleHor=MvLX[xNb][yNb+nNbH−1][0]<<[[7]] {{Ctb Log 2SizeY}}   (8-533)

mvScaleVer=MvLX[xNb][yNb+nNbH−1][1]<<[[7]] {{Ctb Log 2SizeY}}   (8-534)

Otherwise (isCTUboundary is equal to FALSE), the following applies:

mvScaleHor=CpMvLX[xNb][yNb][0][0]<<[[7]]{{Ctb Log 2SizeY}}   (8-537)

mvScaleVer=CpMvLX[xNb][yNb][0][1]<<[[7]]{{Ctb Log 2SizeY}}   (8-538)
...

8.5.5.6 Derivation process for constructed affine control point motion vector merging candidates
...

When availableFlagCorner[0] is equal to TRUE and availableFlagCorner[2] is equal to TRUE, the following applies:
    For X being replaced by 0 or 1, the following applies:
      The variable availableFlagLX is derived as follows:
        If all of following conditions are TRUE, availableFlagLX is set equal to TRUE:
          predFlagLXCorner[0] is equal to 1
          predFlagLXCorner[2] is equal to 1
          refIdxLXCorner[0] is equal to refIdxLXCorner[2]
      Otherwise, availableFlagLX is set equal to FALSE.
    When availableFlagLX is equal to TRUE, the following applies:
      The second control point motion vector cpMvLXCorner[1] is derived as follows:

cpMvLXCorner[1][0]=(cpMvLXCorner[0][0]<<[[7]] {{Ctb Log 2SizeY}})+((cpMvLXCorner[2][1]−cpMvLXCorner[0][1])   (8-606)

<<([[7]]{{Ctb Log 2SizeY}}+Log 2(cbHeight/cbWidth)))cpMvLXCorner[1][1]=(cpMvLXCorner[0][1]<<[[7]]{{Ctb Log 2SizeY}})+((cpMvLXCorner[2][0]−cpMvLXCorner[0][0])   (8-607)

<<([[7]]{{Ctb Log 2SizeY}}+Log 2(cbHeight/cbWidth)))

8.5.5.9 Derivative process for motion vector arrays from affine control point motion vectors The variables mvScaleHor, mvScaleVer, dHorX and dVerX are derived as follows:

mvScaleHor=cpMvLX[0][0]<<[[7]]{{Ctb Log 2SizeY}}   (8-665)

mvScaleVer=cpMvLX[0][1]<<[[7]]{{Ctb Log 2SizeY}}   (8-666)

5.4 Embodiment #4 on Allowing BT and TT Split Depending on Block Size

As shown in FIG. 1, TT split may be allowed for a coding block with block size 64×64, and BT split may be allowed for block sizes 32×64, 16×64, 8×64, 64×32, 64×16, 64×8, no matter the maximum transform size is 32×32 or 64×64.

FIG. 1 is an example of allowing BT and TT split depending on block size.

5.5 Embodiment #5 on Applying ISP Dependent on the VPDU Size, or 64×64

The modifications are based on the latest VVC working draft (JVET-O2001-v14)

| Coding unit syntax | |
|---|---|
| coding_unit( x0, y0, cbWidth, cbHeight, cqtDepth, treeType, modeType ) { <br>   chType = treeType = = DUAL_TREE_CHROMA? 1 : 0 <br> ... <br>   if(intra_mip_flag[ x0 ][ y0 ] ) <br>     intra_mip_mode [ x0 ][ y0 ] <br>   else { <br>     if( sps_mrl_enabled_flag && ( ( y0 % CtbSizeY ) > 0 ) ) <br>       intra_luma_ref_idx [ x0 ][ y0 ] <br>     if ( sps_isp_enabled_flag && intra_luma_ref_idx[ x0 ][ y0 ] = = 0 && <br>       ( cbWidth <= [[MaxTbSize]] {{64 (or another option: Vsize) }}&& cbHeight <= [[MaxTbSize]] {{64 (or another option: Vsize) }}) && <br>       ( cbWidth * cbHeight > MinTbSizeY * MinTbSizeY ) ) <br>       intra_subpartitions_mode_flag [ x0 ][ y0 ] <br>     if(intra_subpartitions_mode_flag[ x0 ][ y0 ] = = 1 ) <br>       intra_subpartitions_split_flag [ x0 ][ y0 ] <br>     if(intra_luma_ref_idx[ x0 ][ y0 ] = = 0 ) <br>       intra_luma_mpm_flag [ x0 ][ y0 ] <br>     if( intra_luma_mpm_flag[ x0][ y0 ] ) { <br>       if(intra_luma_ref_idx[ x0 ][ y0 ] = = 0 ) <br>         intra_luma_not_planar_flag [ x0 ][ y0 ] <br>       if( intra_luma_not_planar_flag[ x0][ y0 ] ) <br>         intra_luma_mpm_idx [ x0 ][ y0 ] <br>     }else <br>       intra_luma_mpm_remainder[ x0 ][ y0 ] <br>     } <br>   } <br> ... | Descriptor <br><br><br><br> ae(v) <br><br><br> ae(v) <br><br><br><br><br> ae(v) <br><br> ae(v) <br><br> ae(v) <br><br><br> ae(v) <br><br><br> ae(v) <br><br> ae(v) |

| Transform tree syntax | |
|---|---|
| transform_tree( x0, y0, tbWidth, tbHeight, treeType, chType ) { | Descriptor |

```
transform_tree( x0, y0, tbWidth, tbHeight, treeType, chType ) {
  InferTuCbfLuma = 1
  if( IntraSubPartitionsSplitType = = ISP_NO_SPLIT && !cu_sbt_flag ) {
    if( tbWidth > MaxTbSizeY | | tbHeight > MaxTbSizeY ) {
      verSplitFirst = ( tbWidth > MaxTbSizeY && tbWidth > tbHeight) ? 1 : 0
      trafoWidth = verSplitFirst ? (tbWidth / 2) : tbWidth
      trafoHeight = !verSplitFirst ? (tbHeight / 2) : tbHeight
      transform_tree( x0, y0, trafoWidth, trafoHeight, chType )
      if( verSplitFirst )
        transform_tree( x0 + trafoWidth, y0, trafoWidth, trafoHeight, treeType, chType )
      else
        transform_tree( x0, y0 + trafoHeight, trafoWidth, trafoHeight, treeType, chType )
    } else {
      transform_unit( x0, y0, tbWidth, tbHeight, treeType, 0, chType )
    }
  } else if( cu_sbt_flag ) {
    if( !cu_sbt_horizontal_flag ) {
      trafoWidth = tbWidth * SbtNumFourthsTb0 / 4
      transform_unit( x0, y0, trafoWidth, tbHeight, treeType, 0, 0)
      transform_unit( x0 + trafoWidth, y0, tbWidth − trafoWidth, tbHeight, treeType, 1, 0)
    } else {
      trafoHeight = tbHeight * SbtNumFourthsTb0 / 4
      transform_unit( x0, y0, tbWidth, trafoHeight, treeType, 0, 0)
      transform_unit( x0, y0 + trafoHeight, tbWidth, tbHeight − trafoHeight, treeType, 1, 0)
    }
  } else if( IntraSubPartitionsSplitType = = ISP_HOR_SPLIT) {
    trafoHeight = tbHeight / NumIntraSubPartitions
    for( partIdx = 0; partIdx < NumIntraSubPartitions; partIdx++ ) {
```

```
{{   if(tbWidth >MaxTbSizeY ) {
       transform_unit( x0, y0 + trafoHeight * partIdx, tbWidth/2, trafoHeight, treeType, partIdx, 0)
       transform_unit( x0 +
tbWidth/2, y0 + trafoHeight * partIdx, tbWidth/2, trafoHeight, treeType, partIdx, 0 )
    } else {}}
       transform_unit( x0, y0 + trafoHeight * partIdx, tbWidth, trafoHeight, treeType, partIdx, 0)
         {{}}}
     {{}}}
  } else if( IntraSubPartitionsSplitType = = ISP_VER_SPLIT) {
    trafoWidth = tbWidth / NumIntraSubPartitions
    for( partIdx = 0; partIdx < NumIntraSubPartitions; partIdx++ ) {{{
      if(Height > MaxTbSizeY ) {
        transform_unit( x0 + trafoWidth * partIdx, y0, trafoWidth, tbHeight/2, treeType, partIdx, 0)
        transform_unit( x0 + trafoWidth * partIdx, y0
+tbHeight/2, trafoWidth, tbHeight/2, treeType, partIdx, 0)
      } else {}}
        transform_unit( x0 +trafoWidth partIdx, y0, trafoWidth, tbHeight, treeType, partIdx, 0)
          {{}}}
     {{}}}
  }
}
```

Coding Unit Semantics intra_subpartitions_split_flag[x0][y0] specifies whether the intra subpartitions split type is horizontal or vertical. When intra_subpartitions_split_flag[x0][y0] is not present, it is inferred as follows:

If cbHeight is greater than [[MaxTbSize]]{{64 (or another option: Vsize)}}, intra_subpartitions_split_ flag[x0][y0] is inferred to be equal to 0.

Otherwise (cbWidth is greater than [[MaxTbSize]]{{64 (or another option: Vsize)}}), intra_subpartitions_split_ flag[x0][y0] is inferred to be equal to 1.

5.6 Embodiment #6 on Applying MIP Dependent on the VPDU Size, or 64×64

The embodiment below is for the invented method that making the ISP dependent on the VPDU size. The modifications are based on the latest VVC working draft (JVET-O2001-v14)

| Coding unit syntax | |
|---|---|
| coding_unit( x0, y0, cbWidth, cbHeight, cqtDepth, treeType, modeType ) {<br>  chType = treeType = = DUAL_TREE_CHROMA? 1 : 0<br>...<br>  } else {<br>    if( sps_bdpcm_enabled_flag &&<br>      cbWidth <= MaxTsSize && cbHeight <= MaxTsSize )<br>      intra_bdpcm_flag | Descriptor<br><br><br><br><br><br>ae(v) |

| Coding unit syntax |  |
|---|---|
| if( intra_bdpcm_flag )  |  |
|    intra_bdpcm_dir_flag | ae(v) |
| else { |  |
|   if( sps_mip_enabled_flag && |  |
|     (Abs( Log2( cbWidth ) − Log2( cbHeight ) ) <= 2 ) && |  |
|     cbWidth <= [[MaxTbSizeY]] {{64 (or another option: Vsize)}}&& |  |
|   cbHeight <= [[MaxTbSizeY]] {{64 (or another option: Vsize)}}}) |  |
|     intra_mip_flag [x0][y0] | ae(v) |
|   if( intra_mip_flag[x0][y0] |  |
|     intra_mip_mode [x0][y0] | ae(v) |
|   else { |  |

5.7 Embodiment #7 on Applying SBT Dependent on the Maximum Transform Size

| Sequence parameter set RBSP syntax |  |
|---|---|
| sps_sbt_enabled_flag | u(1) |
| [[ if( sps_sbt_enabled_flag) |  |
|   sps_sbt_max_size_64_flag | u(1)]] |
| sps_affine_enabled_flag | u(1) |
| if( sps_affine_enabled_flag) { |  |
|   sps_affine_type_flag | u(1) |
|   sps_affine_amvr_enabled_flag | u(1) |
|   sps_affine_prof_enabled_flag | u(1) |
| } |  |

| Coding unit syntax | Descriptor |
|---|---|
| coding_unit( x0, y0, cbWidth, cbHeight, cqtDepth, treeType, modeType ) { |  |
|   chType = treeType = = DUAL_TREE_CHROMA? 1 : 0 |  |
| ... |  |
|   if( cu_cbf) { |  |
|     if( CuPredMode[ chType ][ x0 ][ y0 ] = = MODE_INTER && sps_sbt_enabled_flag |  |
|     && !ciip_flag[ x0 ][ y0 ] && !MergeTriangleFlag[ x0 ][ y0 ] ) { |  |
|     if( cbWidth <= [[MaxSbtSize]] {{MaxTbSizeY}} && cbHeight <= [[MaxSbtSize]] {{MaxTbSizeY}}}) { |  |
|       allowSbtVerH = cbWidth >= 8 |  |
|       allowSbtVerQ = cbWidth >= 16 |  |
|       allowSbtHorH = cbHeight >= 8 |  |
|       allowSbtHorQ = cbHeight >= 16 |  |
|       if( allowSbtVerH \|\| allowSbtHorH \|\| allowSbtVerQ \|\| allowSbtHorQ ) |  |
|         cu_sbt_flag | ae(v) |
|     } |  |
|     if( cu_sbt_flag) { |  |
|       if( ( allowSbtVerH \|\| allowSbtHorH) && ( allowSbtVerQ \|\| allowSbtHorQ) ) |  |
|         cu_sbt_quad_flag | ae(v) |
|       if( ( cu_sbt_quad_flag && allowSbtVerQ && allowSbtHorQ ) \|\| |  |
|         ( !cu_sbt_quad_flag && allowSbtVerH && allowSbtHorH)) |  |
|         cu_sbt_horizontal_flag | ae(v) |
|         cu_sbt_pos_flag | ae(v) |
|     } |  |
|   } |  |
| } |  |
| ... |  |

Sequence Parameter Set RBSP Semantics

[[sps_sbt_max_size_64_flag equal to 0 specifies that the maximum CU width and height for allowing subblock transform is 32 luma samples. sps_sbt_max_size_64_flag equal to 1 specifies that the maximum CU width and height for allowing subblock transform is 64 luma samples.

$$\text{MaxSbtSize} = \text{Min}(\text{MaxTbSizeY}, \text{sps\_sbt\_max\_size\_64\_flag}?64:32) \quad (7\text{-}32)]]$$

5.8 Embodiment #8 on Applying Transform Skip Dependent on the Maximum Transform Size

| Picture parameter set RBSP syntax |  |
|---|---|
| pic_parameter_set_rbsp( ) { | Descriptor |
| ... |  |
|   num_ref_idx_default_active_minus1 [ i ] | ue(v) |
|   rpl1_idx_present_flag | u(1) |
|   init_qp_minus26 | se(v) |

| Picture parameter set RBSP syntax | |
|---|---|
| [[ if( sps_transform_skip_enabled_flag ) | |
|    log2_transform_skipmax_size_minus2 | ue(v)]] |
| cu_qp_delta_enabled_flag | u(1) |
| if( cu_qp_delta_enabled_flag ) | |

| Picture parameter set RBSP syntax | |
|---|---|
|    cu_qp_delta_subdiv | ue(v) |
| pps_cb_qp_offset | se(v) |
| pps_cr_qp_offset | se(v) |

| Coding unit syntax | |
|---|---|
| coding_unit( x0, y0, cbWidth, cbHeight, cqtDepth, treeType, modeType ) { | Descriptor |
| ... | |
|   if( CuPredMode[ chType ][ x0 ][ y0 ] = = MODE_INTRA \|\| | |
|     CuPredMode[ chType ][ x0 ][ y0 ] = = MODE_PLT) { | |
|     if( treeType = = SINGLE_TREE \|\| treeType = = DUAL_TREE_LUMA ) { | |
|       if( pred_mode_plt_flag) { | |
|         if( treeType = = DUAL_TREE_LUMA ) | |
|           palette_coding( x0, y0, cbWidth, cbHeight, 0, 1) | |
|         else /* SINGLE_TREE */ | |
|           palette_coding( x0, y0, cbWidth, cbHeight, 0, 3) | |
|     } else { | |
|       if( sps_bdpcm_enabled_flag && | |
|         cbWidth <= [[MaxTsSize]] {{MaxTbSizeY}} && cbHeight <= [[MaxTsSize]] {{MaxTbSizeY}}) | |
|         intra_bdpcm_flag | ae(v) |
|       if( intra_bdpcm_flag ) | |
|         intra_bdpcm_dir_flag | ae(v) |
|       else { | |

| Transform unit syntax | |
|---|---|
| transform_unit( x0, y0, tbWidth, tbHeight, treeType, subTuIndex, chType) { | Descriptor |
| ... | |
|   if( tu_cbf_luma[ x0 ][ y0 ] && treeType != DUAL_TREE_CHROMA | |
|     && ( tbWidth <= 32 ) && ( tbHeight <= 32) | |
|     && IntraSubPartitionsSplit[ x0 ][ y0 ] = = ISP_NO_SPLIT) | |
|   && ( !cu_sbt_flag) ) { | |
|     if( sps_transform_skip_enabled_flag && !BdpcmFlag[ x0 ][ y0 ] && | |
|       tbWidth <= [[MaxTsSize]] {{MaxTbSizeY}} && tbHeight <= [[MaxTsSize]] {{MaxTbSizeY}}) | |
|       transform_skip_flag[ x0 ][ y0 ] | ae(v) |
|     if( ( ( CuPredMode[ chType ][ x0 ][ y0 ] = = MODE_INTER && | |
|       sps_explicit_mts_inter_enabled_flag) | |
|      \|\| ( CuPredMode[ chType ][ x0 ][ y0 ] = = MODE_INTRA && | |
|       sps_explicit_mts_intra_enabled_flag) ) && ( !transform_skip_flag[ x0 ][ y0 ] ) ) | |
|       tu_mts_idx [ x0 ][ y0 ] | ae(v) |

Picture Parameter Set RBSP Semantics

[[*log2_transform_skip_max_size_minus2* specifies the maximum block size used for transform skip, and shall be in the range of 0 to 3.

When not present, the value of log 2_transform_skip_max_size_minus2 is inferred to be equal to 0.

The variable MaxTsSize is set equal to 1<<(log 2_transform_skip_max_size_minus2+2).]]

5.9 Embodiment #9 on Ciip_Flag Dependent on the Maximum Transform Size

| Merge data syntax | |
|---|---|
| merge_data( x0, y0, cbWidth, cbHeight, chType ) { | Descriptor |
|   if ( CuPredMode[ chType ][ x0 ][ y0 ] = = MODE_IBC) { | |
|     if( MaxNumIbcMergeCand > 1) | |
|       merge_idx [ x0 ][ y0 ] | ae(v) |
|   } else { | |
|     if( MaxNumSubblockMergeCand > 0 && cbWidth >= 8 && cbHeight >= 8) | |
|       merge_subblock_flag[ x0 ][ y0 ] | ae(v) |
|     if( merge_subblock_flag[ x0 ][ y0 ] = = 1) { | |
|       if( MaxNumSubblockMergeCand > 1) | |

| Merge data syntax | |
|---|---|
| `  merge_subblock_idx[ x0 ][ y0 ]` | ae(v) |
| `  } else {` | |
| `    if( ( cbWidth * cbHeight) >= 64 && ( (sps_ciip_enabled_flag &&` | |
| `       cu_skip_flag[ x0 ][ y0 ] = = 0 && cbWidth <= {{MaxTbSizeY}} &&` | |
| `cbHeight <= {{MaxTbSizeY}} })` | |
| `       ( sps_triangle_enabled_flag && MaxNumTriangleMergeCand >1 &&` | |
| `       slice_type = = B ) ) )` | |
| `      regular_merge_flag [ x0 ][ y0 ]` | ae(v) |
| `      if( regular_merge_flag[ x0 ][ y0 ] = = 1 ){` | |
| `        if( sps_mmvd_enabled_flag)` | |
| `          mmvd_merge_flag [ x0 ][ y0 ]` | ae(v) |
| `        if( mmvd_merge_flag[ x0 ][ y0 ] = = 1 ) {` | |
| `          if( MaxNumMergeCand > 1 )` | |
| `            mmvd_cand_flag [ x0 ][ y0 ]` | ae(v) |
| `          mmvd_distance_idx [ x0 ][ y0 ]` | ae(v) |
| `          mmvd_direction_idx [ x0 ][ y0 ]` | ae(v) |
| `        } else {` | |
| `          if( MaxNumMergeCand > 1)` | |
| `            merge_idx [ x0 ][ y0 ]` | ae(v) |
| `        }` | |
| `      } else {` | |
| `        if( sps_ciip_enabled_flag && sps_triangle_enabled_flag &&` | |
| `          MaxNumTriangleMergeCand > 1 && slice_type = = B &&` | |
| `          cu_skip_flag[ x0 ][ y0 ] = = 0 &&` | |
| `          ( cbWidth * cbHeight ) >= 64 && cbWidth <= {{MaxTbSizeY}} &&` | |
| `cbHeight <= {{MaxTbSizeY}} }) {` | |
| `          ciip_flag [ x0 ][ y0 ]` | ae(v) |
| `          if( !ciip_flag + x0 + + y0 + && MaxNumMergeCand >1)` | |
| `            merge_idx [ x0 ][ y0 ]` | ae(v) |
| `          if( !ciip_flag + x0 + + y0 + && MaxNumTriangleMergeCand >1) {` | |
| `            merge_triangle_split_dir [ x0 ][ y0 ]` | ae(v) |
| `            merge_triangle_idx0 [ x0 ][ y0 ]` | ae(v) |
| `            merge_triangle_idx1 [ x0 ][ y0 ]` | ae(v) |
| `          }` | |
| `        }` | |
| `      }` | |
| `    }` | |
| `  }` | |
| `}` | | ciip_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture.

When ciip_flag[x0][y0] is not present, it is inferred as follows:

If all the following conditions are true, ciip_flag[x0][y0] is inferred to be equal to 1:

sps_clip_enabled_flag is equal to 1.
general_merge_flag[x0][y0] is equal to 1.
merge_subblock_flag[x0][y0] is equal to 0.
regular_merge_flag[x0][y0] is equal to 0.
cbWidth is less than or equal to {{MaxTbSizeY}}.
cbHeight is less than or equal to {{MaxTbSizeY}}.
cbWidth*cbHeight is greater than or equal to 64.

Otherwise, ciip_flag[x0][y0] is inferred to be equal to 0.

5.10 Embodiment #10 on Sps_Max_Luma_Transform_Size_64_Flag Dependent on CtbSizeY

| 7.3.2.3 Sequence parameter set RBSP syntax | |
|---|---|
| `seq_parameter_set_rbsp( ) {` | Descriptor |
| `...` | |
| `  if( qtbtt_dual_tree_intra_flag) {` | |
| `    ``sps_log2_diff_min_qt_min_cb_intra_slice_chroma` | ue(v) |
| `    ``sps_max_mtt_hierarchy_depth_intra_slice_chroma` | ue(v) |
| `    if ( sps_max_mtt_hierarchy_depth_intra_slice_chroma != 0 ) {` | |
| `      ``sps_log2_diff_max_bt_min_qt_intra_slice_chroma` | ue(v) |
| `      ``sps_log2_diff_max_tt_min_qt_intra_slice_chroma` | ue(v) |
| `    }` | |
| `  }` | |
| `  {{if(log2_ctu_size_minus5 != 0)}}` | |
| `    ``sps_max_luma_transform_size_64_flag` | u(1) |
| `  if( ChromaArrayType != 0 ) {` | |
| `    ``same_qp_table_for_chroma` | u(1) |
| `    for( i = 0; i < same_qp_table_for_chroma ? 1 : 3; i++ ) {` | |
| `      ``num_points_in_qp_table_minus1[ i ]` | ue(v) |
| `      for( j = 0; j <= num_points_in_qp_table_minus1[ i ]; j++ ) {` | |
| `        ``delta_qp_in_val_minus1[ i ][ j ]` | ue(v) |

| 7.3.2.3 Sequence parameter set RBSP syntax | |
| --- | --- |
|         delta_qp_out_val[ i ][ j ]<br>      }<br>    }<br>  }<br>... | ue(v) |

7.4.3.3. Sequence Parameter Set RBSP Semantics
. . .

*sps_max_luma_transform_ size_64_flag* equal to 1 specifies that the maximum transform size in luma samples is equal to 64. sps_max_luma_transform_size_64_flag equal to 0 specifies that the maximum transform size in luma samples is equal to 32.
When [[CtbSizeY is less than 64,]] {{sps_max_luma_transform_size_64_flag is not present,}} the value of sps_max_luma_transform_size_64_flag [[shall]] {{is inferred to}} be equal to 0.
The variables MinTb Log 2SizeY, MaxTb Log 2SizeY, MinTbSizeY, and MaxTbSizeY are derived as follows:

$$\text{MinTb Log 2SizeY}=2 \tag{7-27}$$

$$\text{MaxTb Log 2SizeY}=sps\_\text{max\_luma\_transform\_size\_64\_flag?6:5} \tag{7-28}$$

$$\text{MinTbSizeY}=1<<\text{MinTb Log 2SizeY} \tag{7-29}$$

$$\text{MaxTbSizeY}=1<<\text{MaxTb Log 2SizeY} \tag{7-30}$$

. . .

Figure 2:
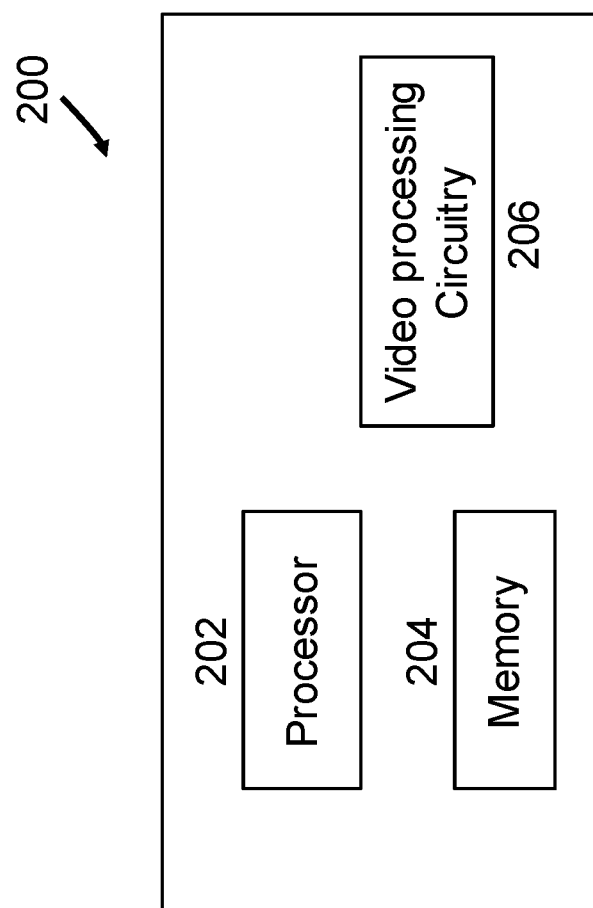
FIG. 2 is a block diagram of an example of a hardware platform used for implementing techniques described in the present document.

FIG. 2 is a block diagram of a video processing apparatus 200. The apparatus 200 may be used to implement one or more of the methods described herein. The apparatus 200 may be embodied in a smartphone, tablet, computer, Internet of Things (IoT) receiver, and so on. The apparatus 200 may include one or more processors 202, one or more memories 204 and video processing hardware 206. The processor(s) 202 may be configured to implement one or more methods described in the present document. The memory (memories) 204 may be used for storing data and code used for implementing the methods and techniques described herein. The video processing hardware 206 may be used to implement, in hardware circuitry, some techniques described in the present document. In some embodiments, the video processing hardware 206 may be at least partially within the processors 202 (e.g., a graphics co-processor).

In some embodiments, the video coding methods may be implemented using an apparatus that is implemented on a hardware platform as described with respect to FIG. 2.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

Figure 3:
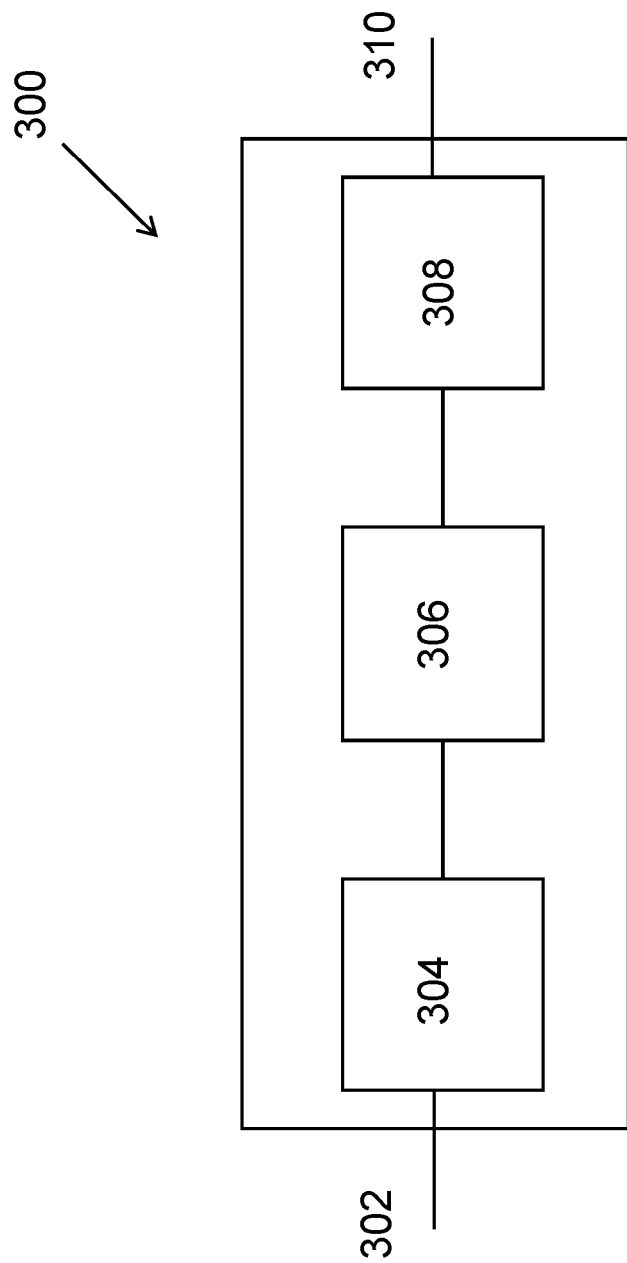
FIG. 3 is a block diagram of an example video processing system in which disclosed techniques may be implemented.

FIG. 3 is a block diagram showing an example video processing system 300 in which various techniques disclosed herein may be implemented. Various implementations may include some or all of the components of the system 300. The system 300 may include input 302 for receiving video content. The video content may be received in a raw or uncompressed format, e.g., 8 or 10 bit multi-component pixel values, or may be in a compressed or encoded format. The input 302 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 300 may include a coding component 304 that may implement the various coding or encoding methods described in the present document. The coding component 304 may reduce the average bitrate of video from the input 302 to the output of the coding component 304 to produce a coded representation of the video. The coding techniques are therefore sometimes called video compression or video transcoding techniques. The output of the coding component 304 may be either stored, or transmitted via a communication connected, as represented by the component 306. The stored or communicated bitstream (or coded) representation of the video received at the input 302 may be used by the component 308 for generating pixel values or displayable video that is sent to a display interface 310. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 4:
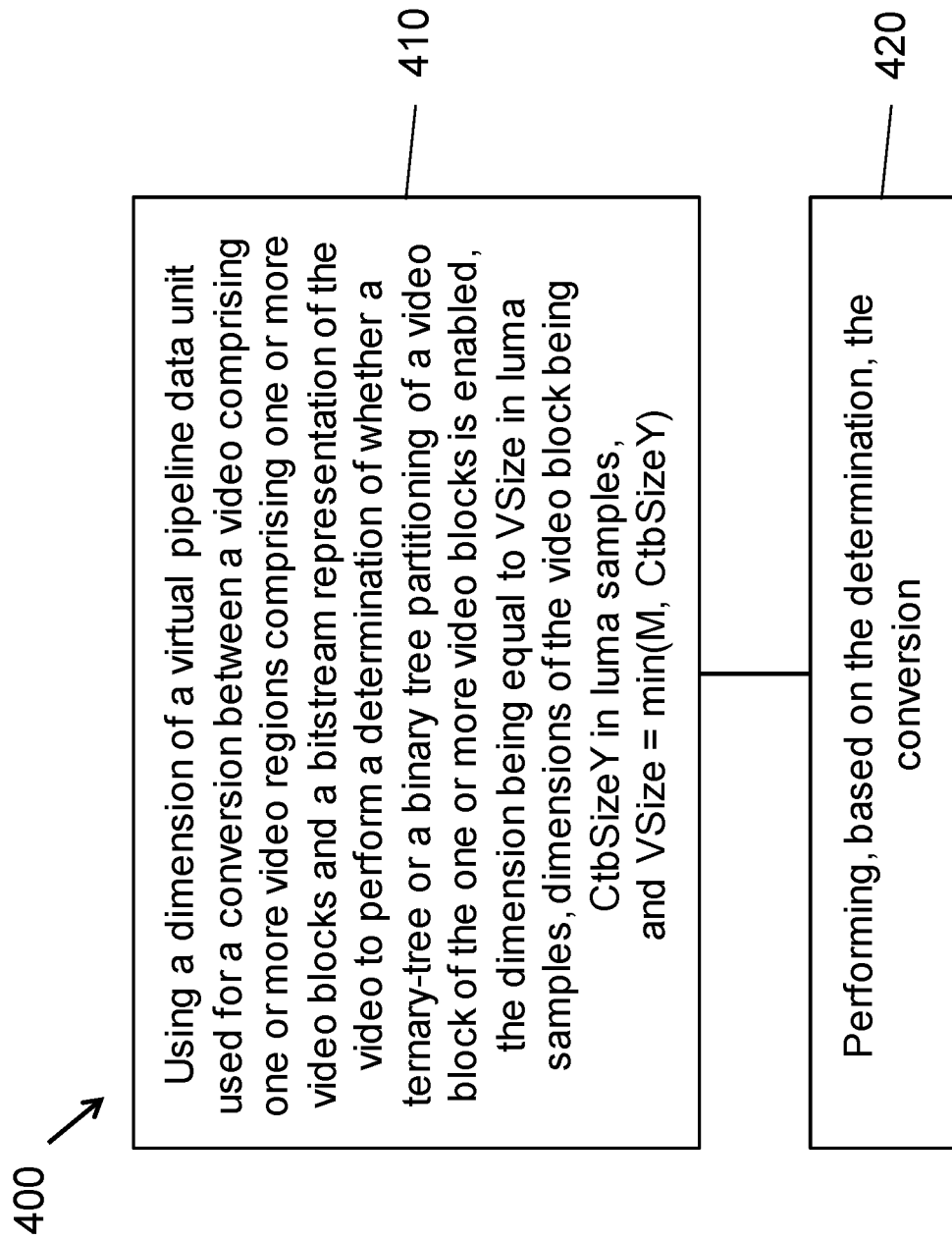
FIG. 4 is a flowchart for an example method of video processing.

FIG. 4 is a flowchart for a method 400 of video processing. The method 400 includes, at operation 410, using a dimension of a virtual pipeline data unit (VPDU) used for a conversion between a video comprising one or more video regions comprising one or more video blocks and a bitstream representation of the video to perform a determination of whether a ternary-tree (TT) or a binary tree (BT) partitioning of a video block of the one or more video blocks is enabled, the dimension being equal to VSize in luma samples.

The method 400 includes, at operation 420, performing, based on the determination, the conversion.

Figure 5:
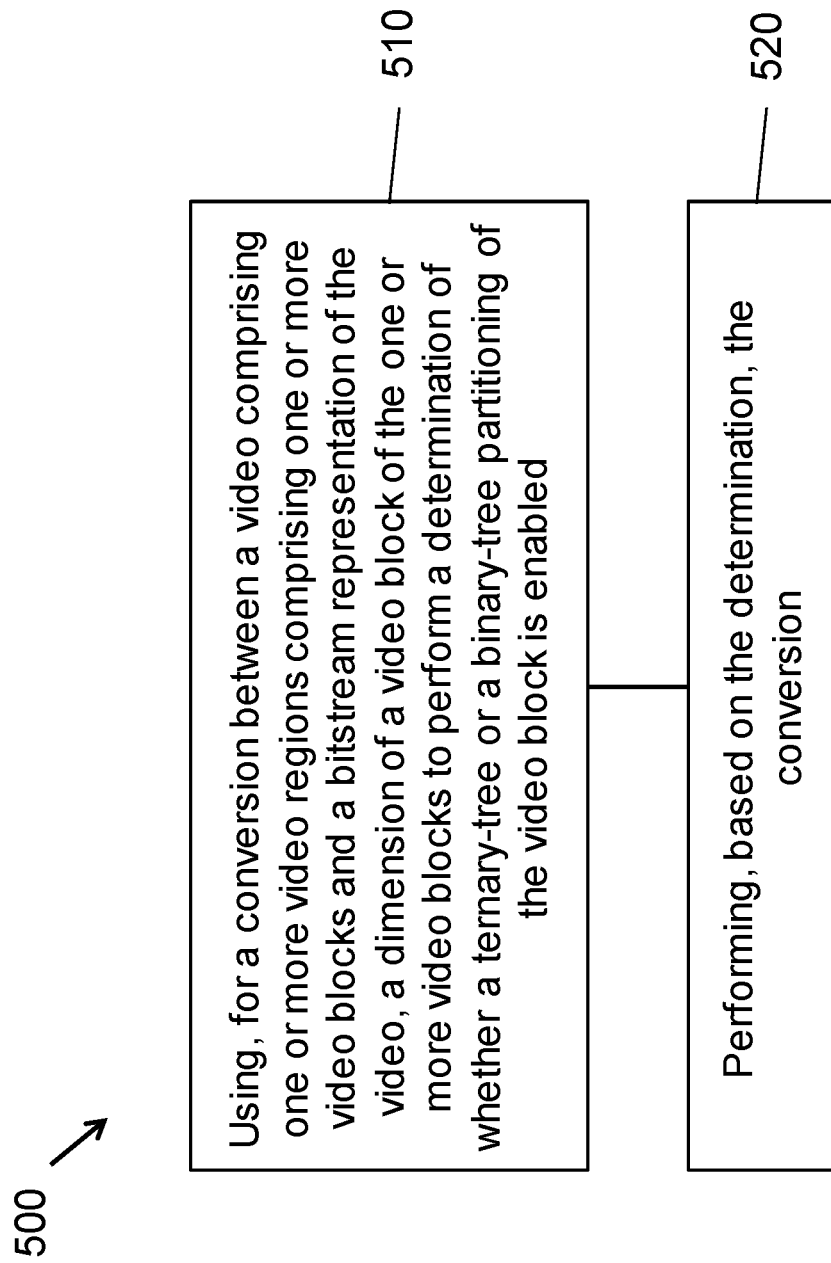
FIG. 5 is a flowchart for another example method of video processing.

FIG. 5 is a flowchart for a method 500 of video processing. The method 500 includes, at operation 510, using, for a conversion between a video comprising one or more video regions comprising one or more video blocks and a bitstream representation of the video, a dimension of a video block of the one or more video blocks to perform a determination of whether a ternary-tree (TT) or a binary-tree (BT) partitioning of the video block is enabled.

The method 500 includes, at operation 520, performing, based on the determination, the conversion.

Figure 6:
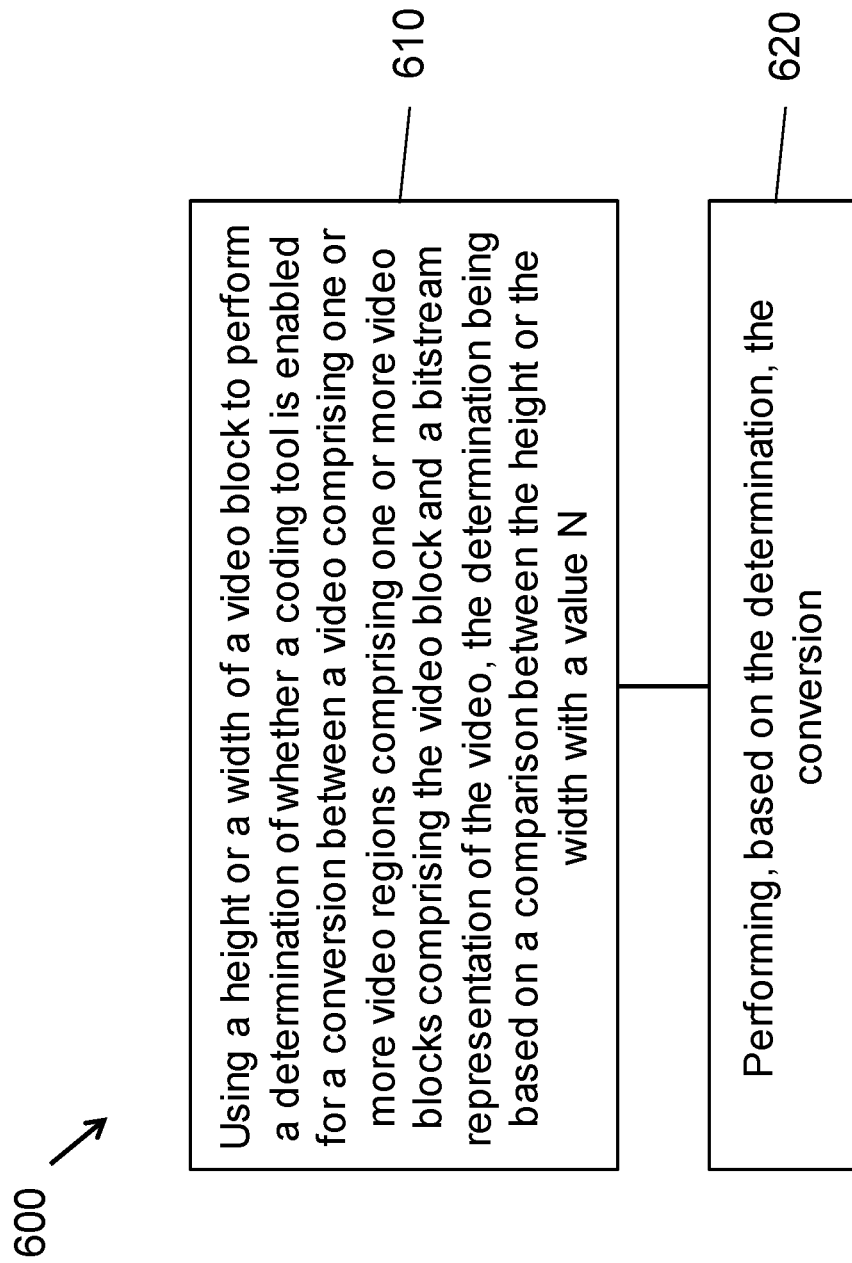
FIG. 6 is a flowchart for yet another example method of video processing.

FIG. 6 is a flowchart for a method 600 of video processing. The method 600 includes, at operation 610, using a height or a width of a video block to perform a determination of whether a coding tool is enabled for a conversion between a video comprising one or more video regions comprising one or more video blocks comprising the video block and a bitstream representation of the video, the determination being based on a comparison between the height or the width with a value N, and N being a positive integer.

The method 600 includes, at operation 620, performing, based on the determination, the conversion.

Figure 7:
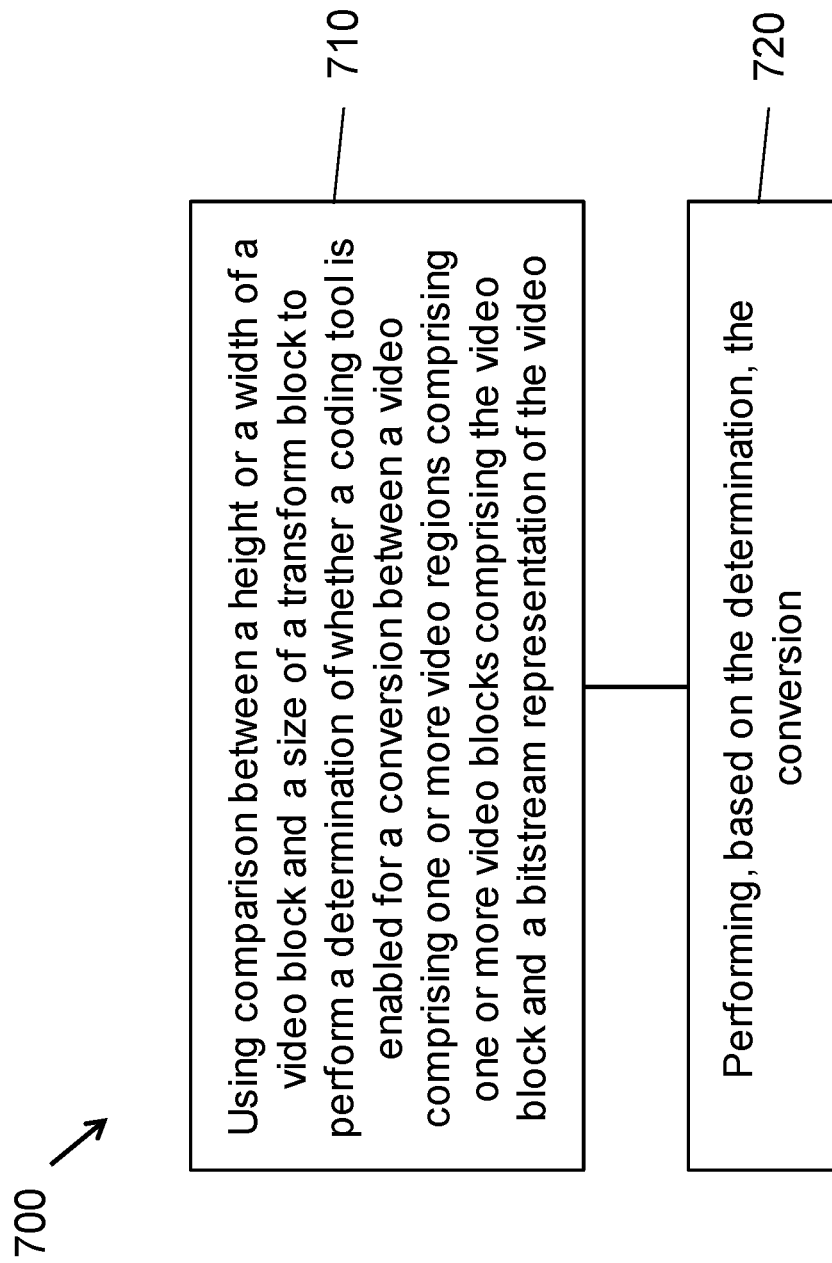
FIG. 7 is a flowchart for yet another example method of video processing.

FIG. 7 is a flowchart for a method 700 of video processing. The method 700 includes, at operation 710, using comparison between a height or a width of a video block and a size of a transform block to perform a determination of whether a coding tool is enabled for a conversion between a video comprising one or more video regions comprising one or more video blocks comprising the video block and a bitstream representation of the video.

The method 700 includes, at operation 720, performing, based on the determination, the conversion.

Figure 8:
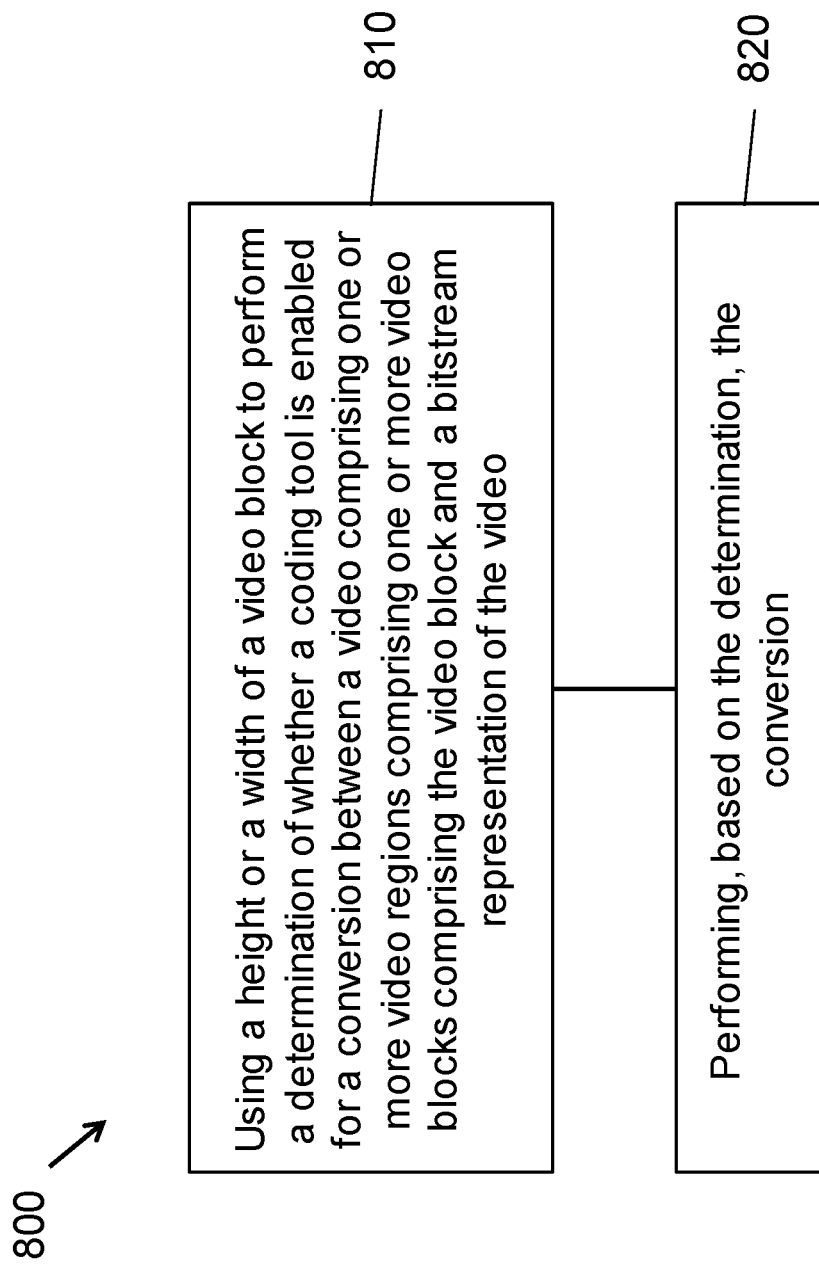
FIG. 8 is a flowchart for yet another example method of video processing.

FIG. 8 is a flowchart for a method 800 of video processing. The method 800 includes, at operation 810, using a height or a width of a video block to perform a determination of whether a coding tool is enabled for a conversion between a video comprising one or more video regions comprising one or more video blocks comprising the video block and a bitstream representation of the video.

The method 800 includes, at operation 820, performing, based on the determination, the conversion.

Figure 9:
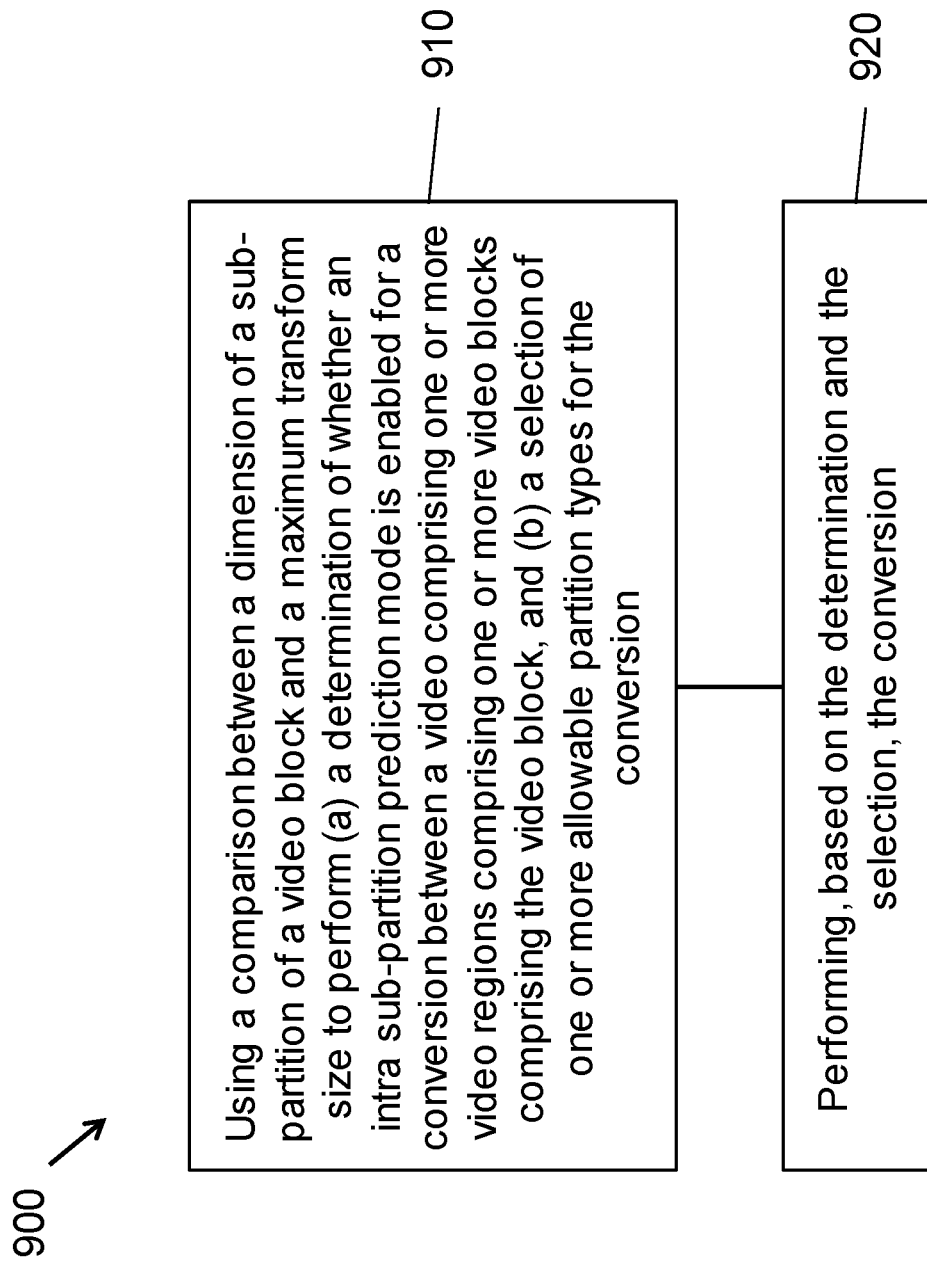
FIG. 9 is a flowchart for yet another example method of video processing.

FIG. 9 is a flowchart for a method 900 of video processing. The method 900 includes, at operation 910, using a comparison between a dimension of a sub-partition of a video block and a maximum transform size to perform (a) a determination of whether an intra sub-partition prediction (ISP) mode is enabled for a conversion between a video comprising one or more video regions comprising one or more video blocks comprising the video block, and (b) a selection of one or more allowable partition types for the conversion.

The method 900 includes, at operation 920, performing, based on the determination and the selection, the conversion.

Figure 10:
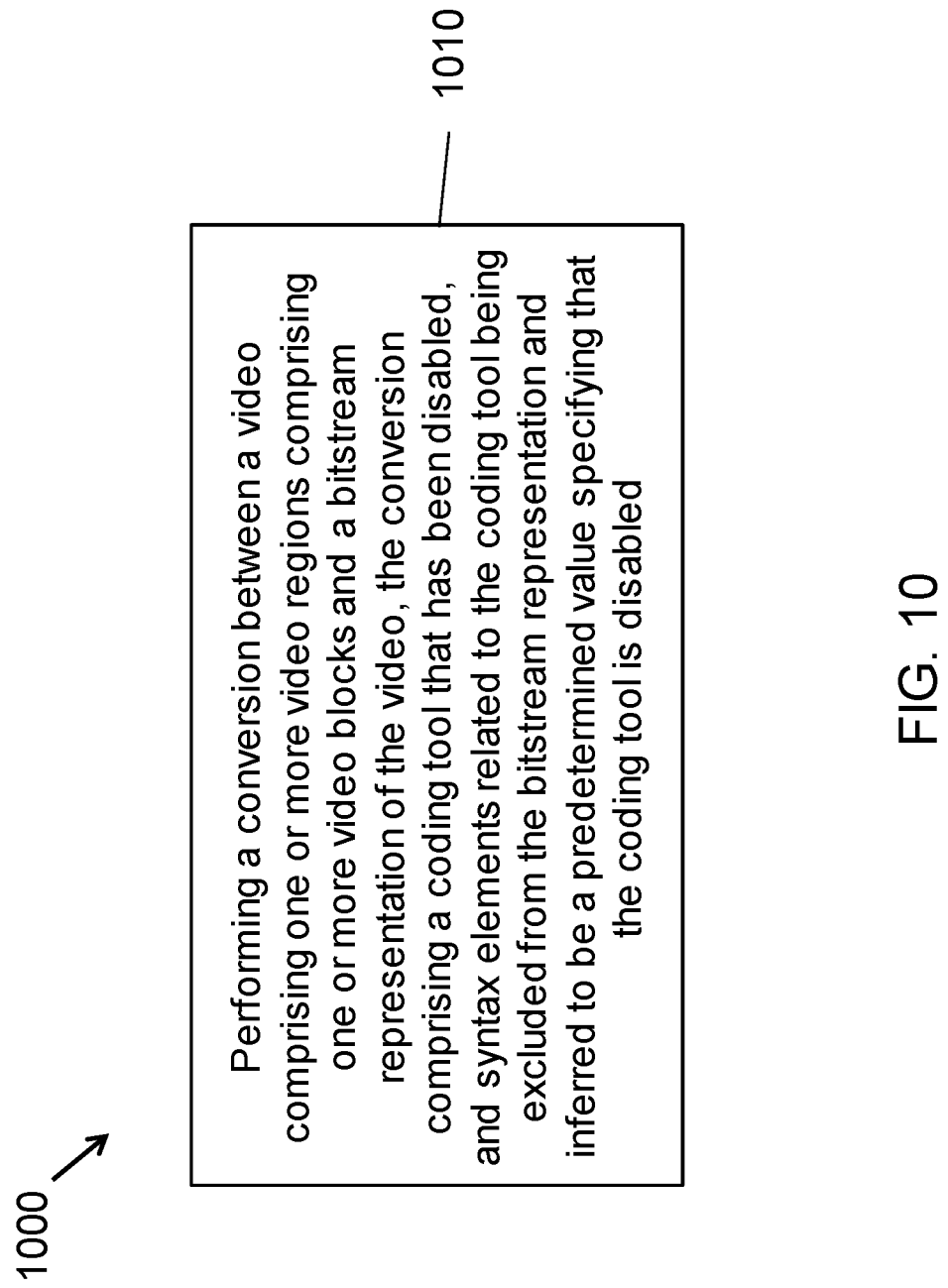
FIG. 10 is a flowchart for yet another example method of video processing.

FIG. 10 is a flowchart for a method 1000 of video processing. The method 1000 includes, at operation 1010, performing a conversion between a video comprising one or more video regions comprising one or more video blocks and a bitstream representation of the video, the conversion comprising a coding tool that has been disabled, and syntax elements related to the coding tool being excluded from the bitstream representation and inferred to be a predetermined value specifying that the coding tool is disabled.

Figure 11:
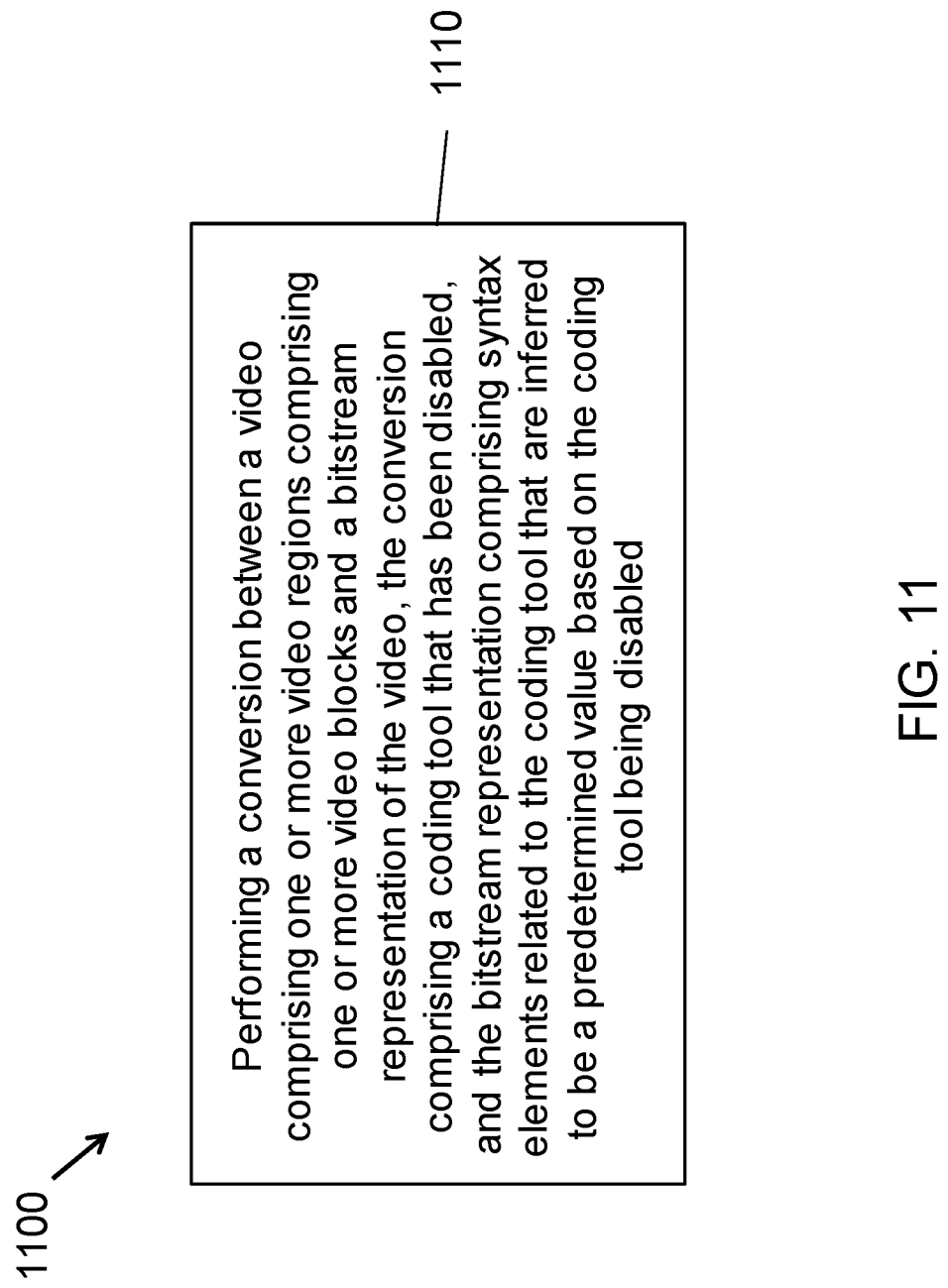
FIG. 11 is a flowchart for yet another example method of video processing.

FIG. 11 is a flowchart for a method 1100 of video processing. The method 1100 includes, at operation 1110, performing a conversion between a video comprising one or more video regions comprising one or more video blocks and a bitstream representation of the video, the conversion comprising a coding tool that has been disabled, and the bitstream representation comprising syntax elements related to the coding tool that are inferred to be a predetermined value based on the coding tool being disabled.

Figure 12:
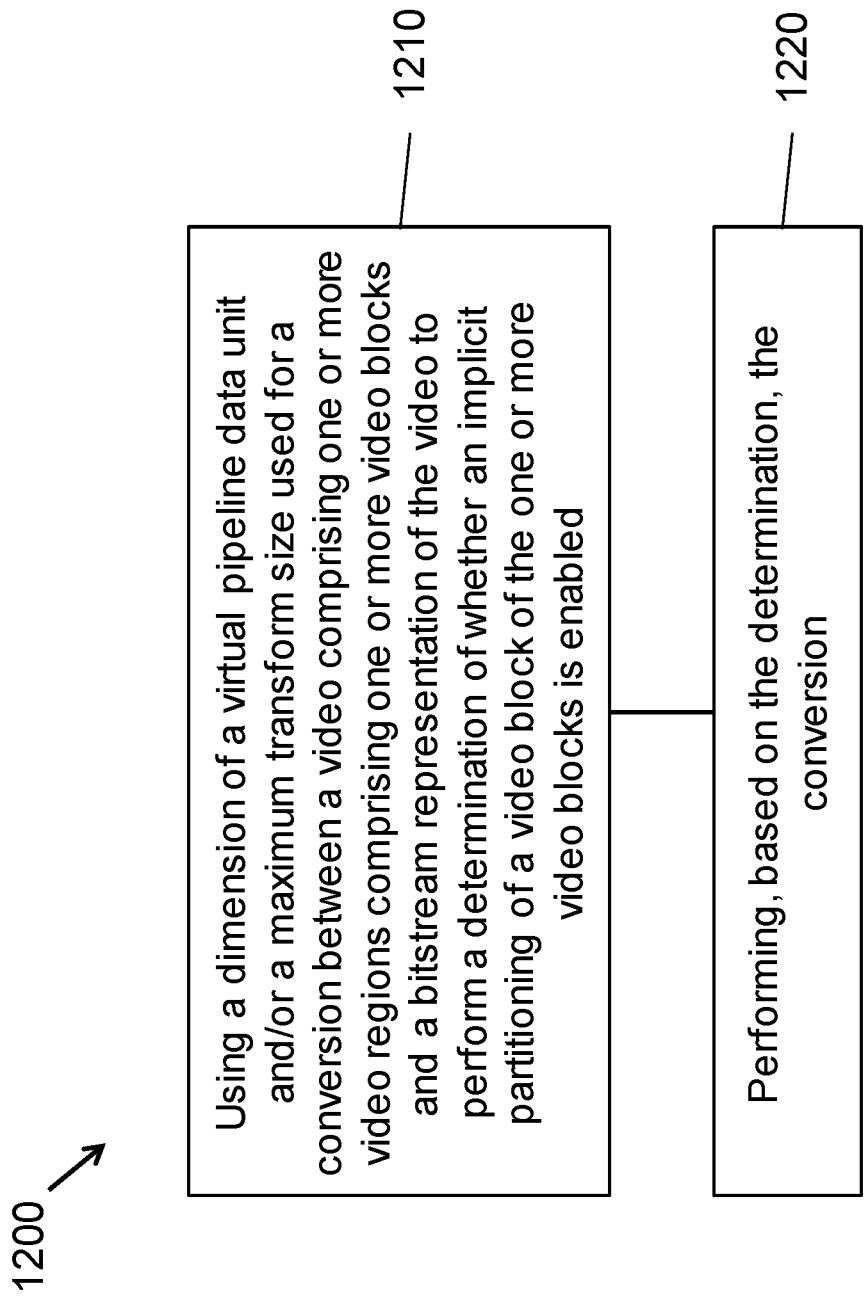
FIG. 12 is a flowchart for yet another example method of video processing.

FIG. 12 is a flowchart for a method 1200 of video processing. The method 1200 includes, at operation 1210, using a dimension of a virtual pipeline data unit (VPDU) and/or a maximum transform size used for a conversion between a video comprising one or more video regions comprising one or more video blocks and a bitstream representation of the video to perform a determination of whether an implicit (QT) partitioning of a video block of the one or more video blocks is enabled.

The method 1200 includes, at operation 1220, performing, based on the determination, the conversion.

Figure 13:
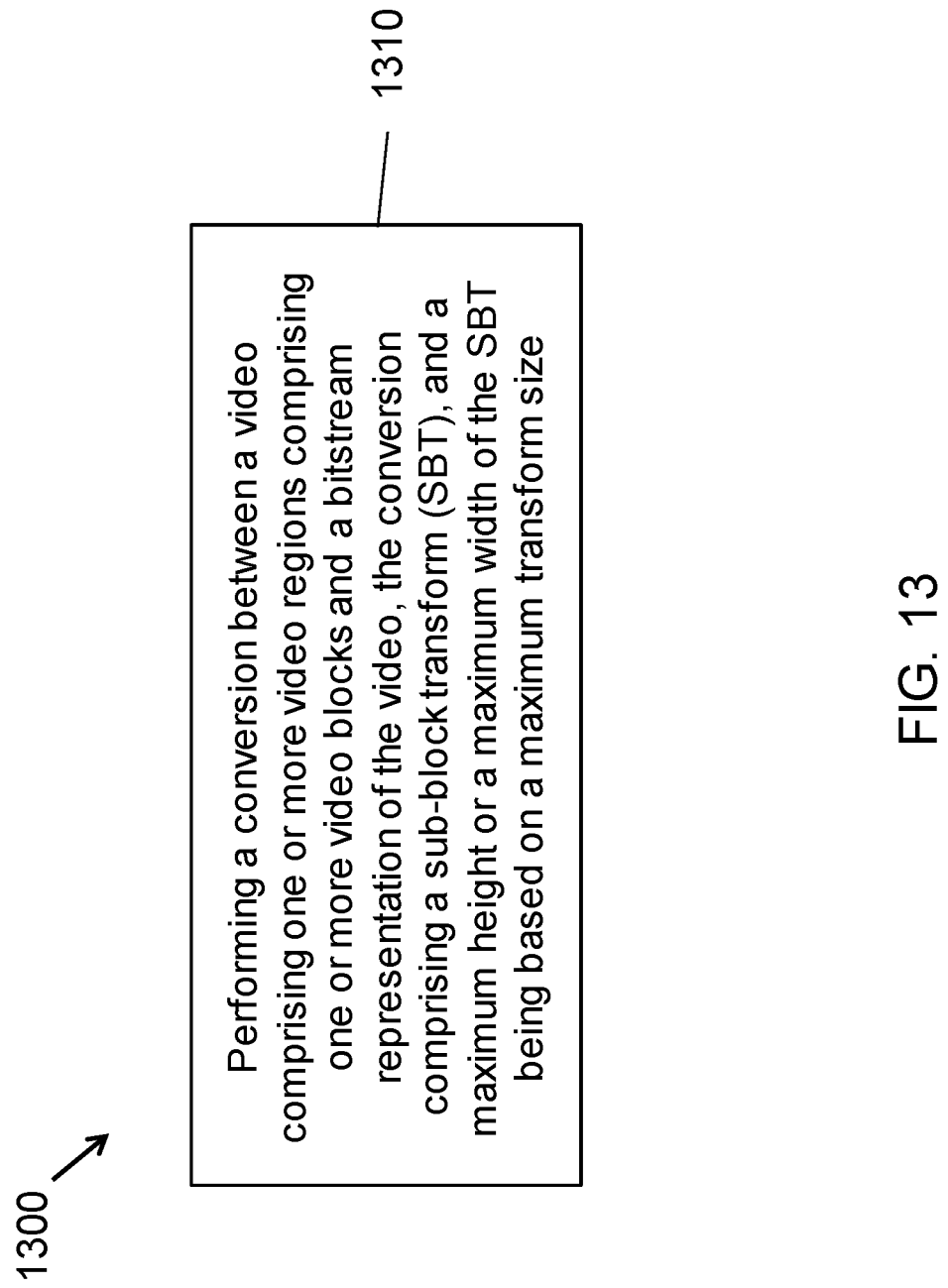
FIG. 13 is a flowchart for yet another example method of video processing.

FIG. 13 is a flowchart for a method 1300 of video processing. The method 1300 includes, at operation 1310, performing a conversion between a video comprising one or more video regions comprising one or more video blocks and a bitstream representation of the video, the conversion comprising a sub-block transform (SBT), and a maximum height or a maximum width of the SBT being based on a maximum transform size.

Figure 14:
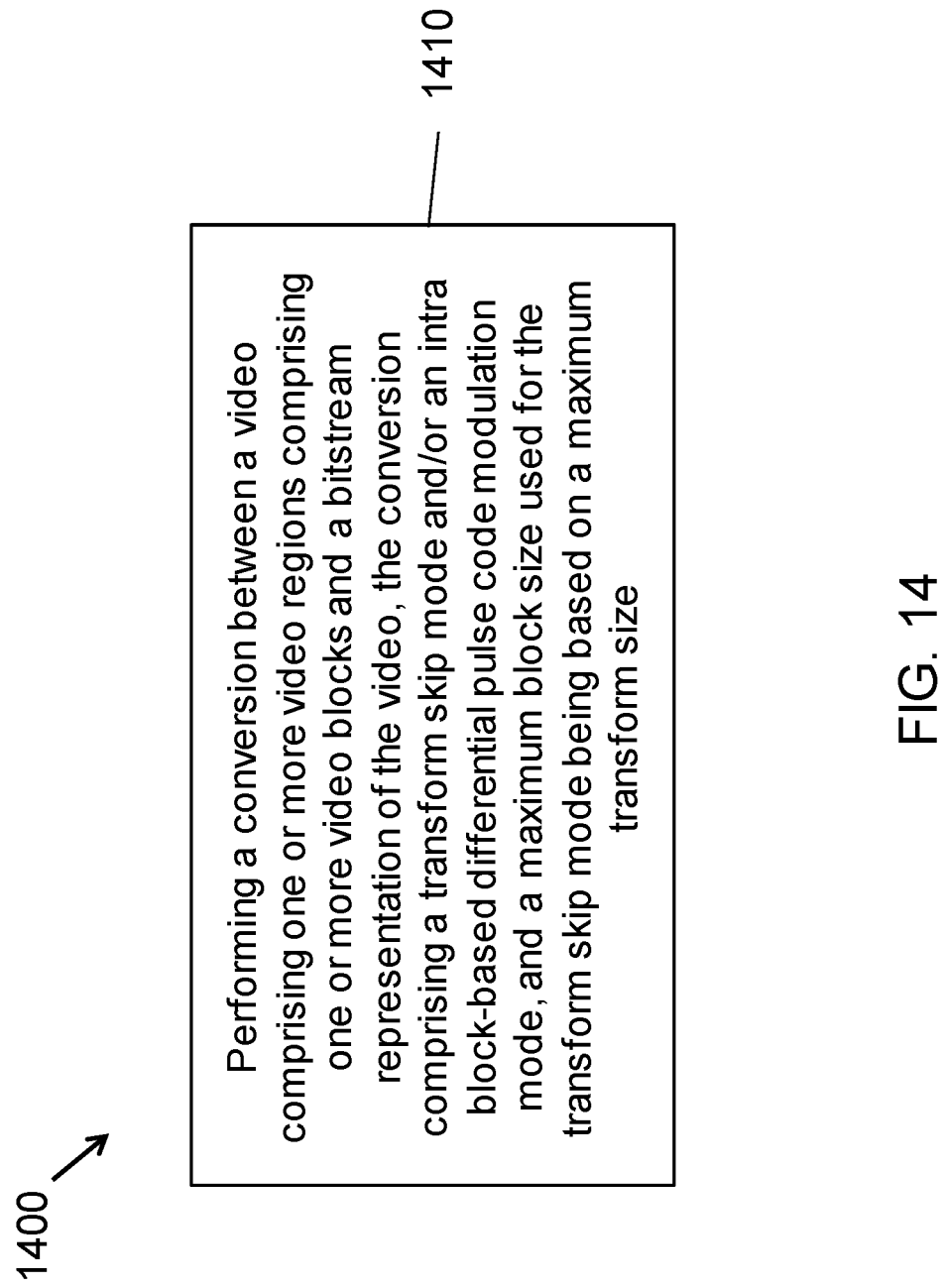
FIG. 14 is a flowchart for yet another example method of video processing.

FIG. 14 is a flowchart for a method 1400 of video processing. The method 1400 includes, at operation 1410, performing a conversion between a video comprising one or more video regions comprising one or more video blocks and a bitstream representation of the video, the conversion comprising a transform skip mode and/or an intra block-based differential pulse code modulation (BDPCM) mode, and a maximum block size used for the transform skip mode being based on a maximum transform size.

Figure 15:
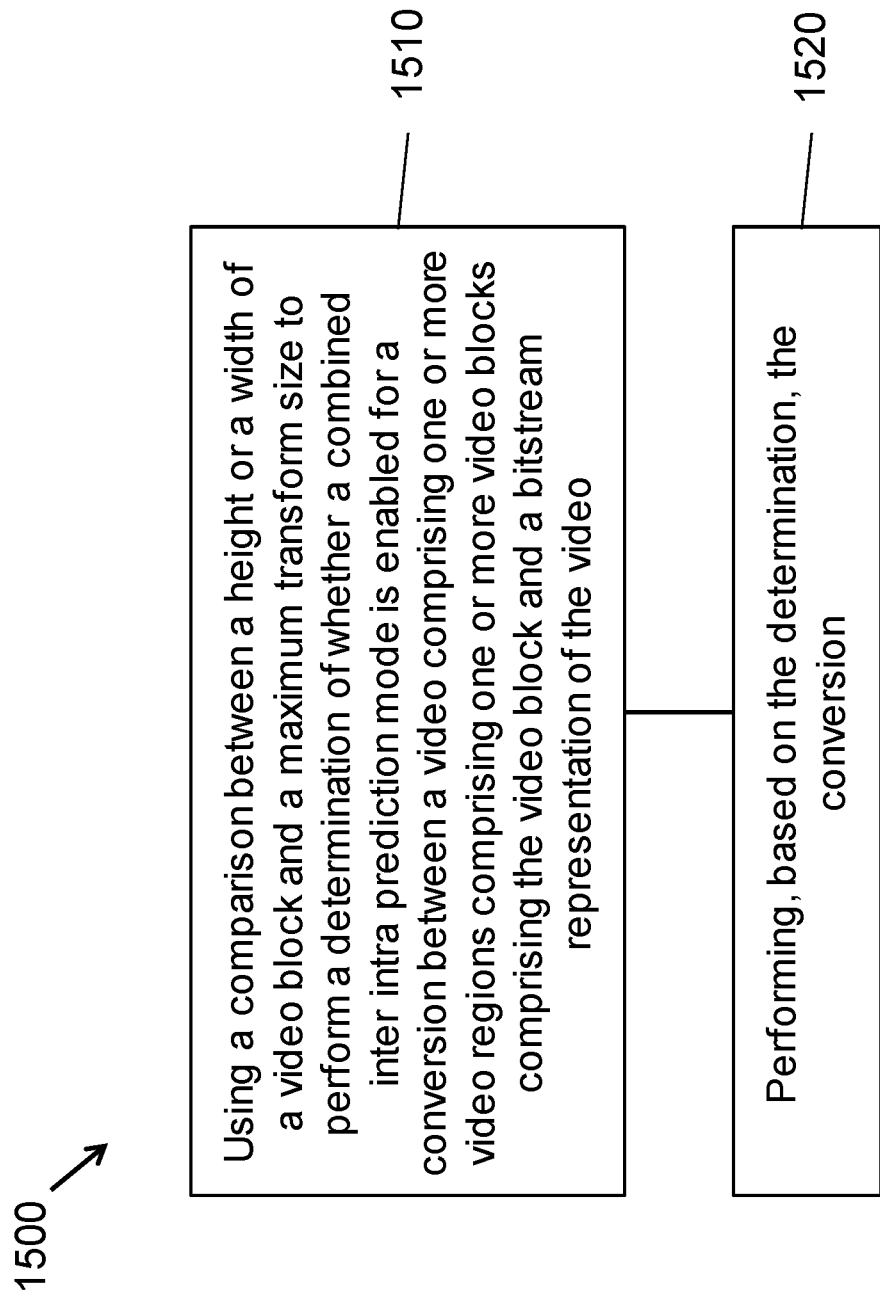
FIG. 15 is a flowchart for yet another example method of video processing.

FIG. 15 is a flowchart for a method 1500 of video processing. The method 1500 includes, at operation 1510, using a comparison between a height or a width of a video block and a maximum transform size to perform a determination of whether a combined inter intra prediction (CIIP) mode is enabled for a conversion between a video comprising one or more video regions comprising one or more video blocks comprising the video block and a bitstream representation of the video.

The method 1500 includes, at operation 1520, performing, based on the determination, the conversion.

Figure 16:
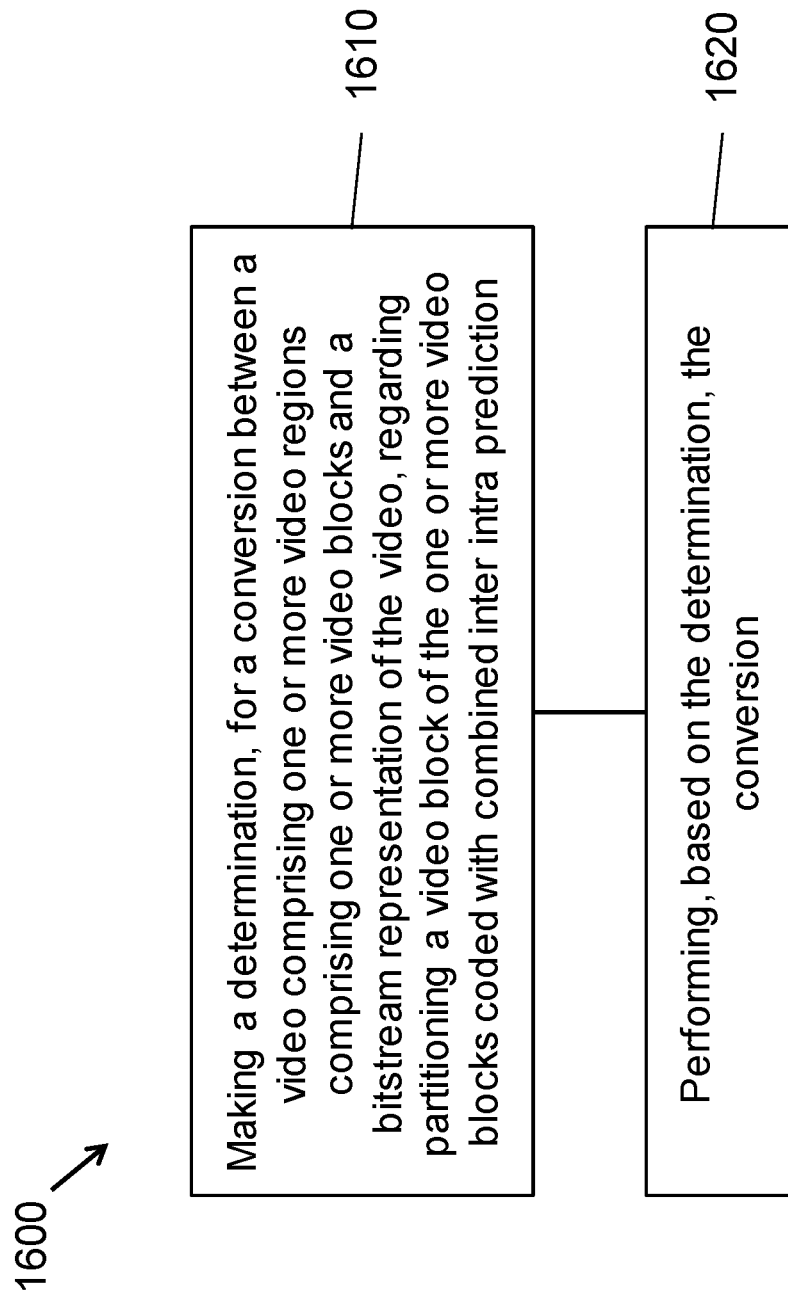
FIG. 16 is a flowchart for yet another example method of video processing.

FIG. 16 is a flowchart for a method 1600 of video processing. The method 1600 includes, at operation 1610, making a determination, for a conversion between a video comprising one or more video regions comprising one or more video blocks and a bitstream representation of the video, regarding partitioning a video block of the one or more video blocks coded with combined inter intra prediction (CIIP).

The method 1600 includes, at operation 1620, performing, based on the determination, the conversion.

Figure 17:
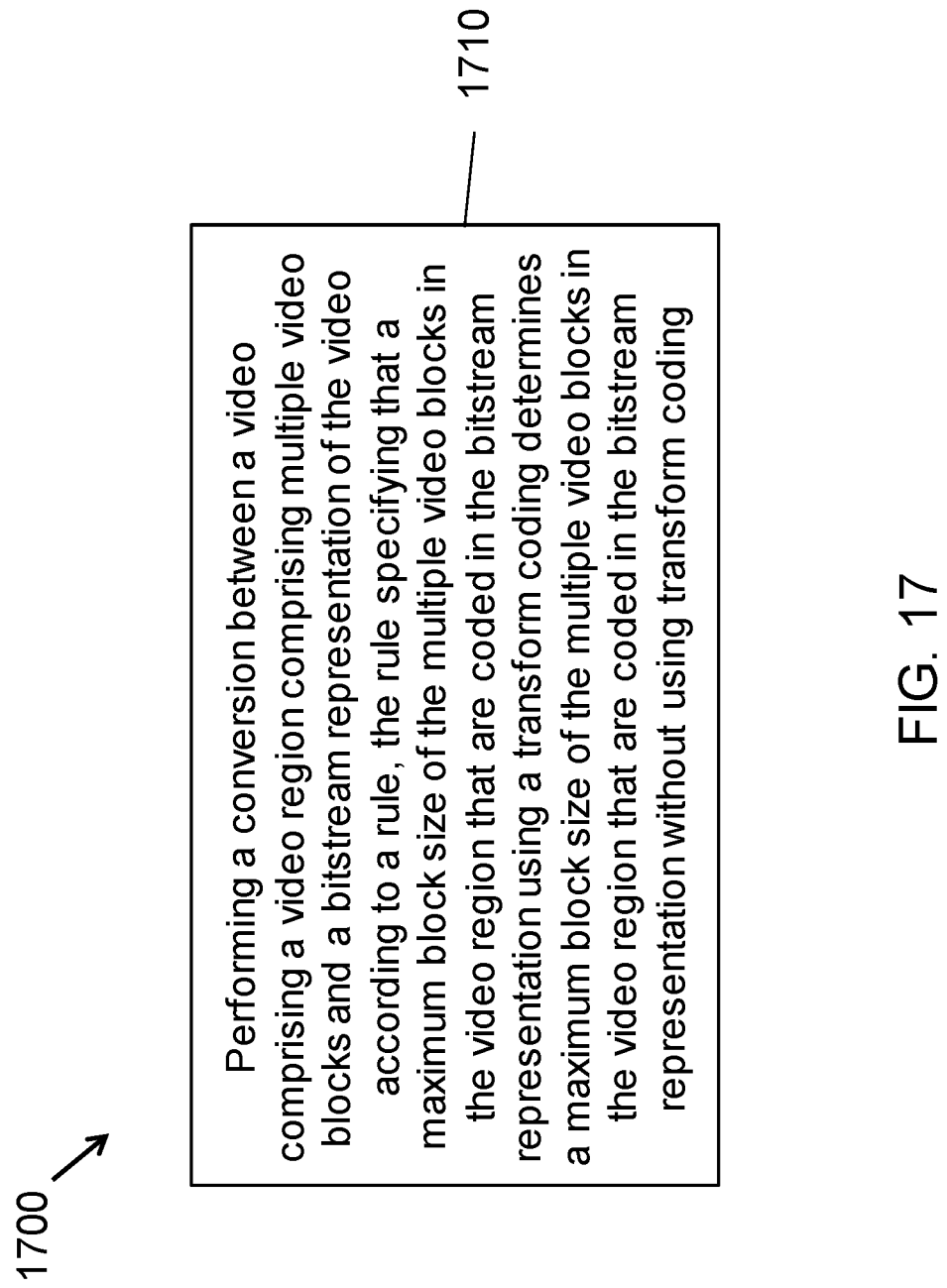
FIG. 17 is a flowchart for yet another example method of video processing.

FIG. 17 is a flowchart for a method 1700 of video processing. The method 1700 includes, at operation 1710, performing a conversion between a video comprising a video region comprising multiple video blocks and a bitstream representation of the video according to a rule, the rule specifying that a maximum block size of the multiple video blocks in the video region that are coded in the bitstream representation using a transform coding determines a maximum block size of the multiple video blocks in the video region that are coded in the bitstream representation without using transform coding.

Figure 18:
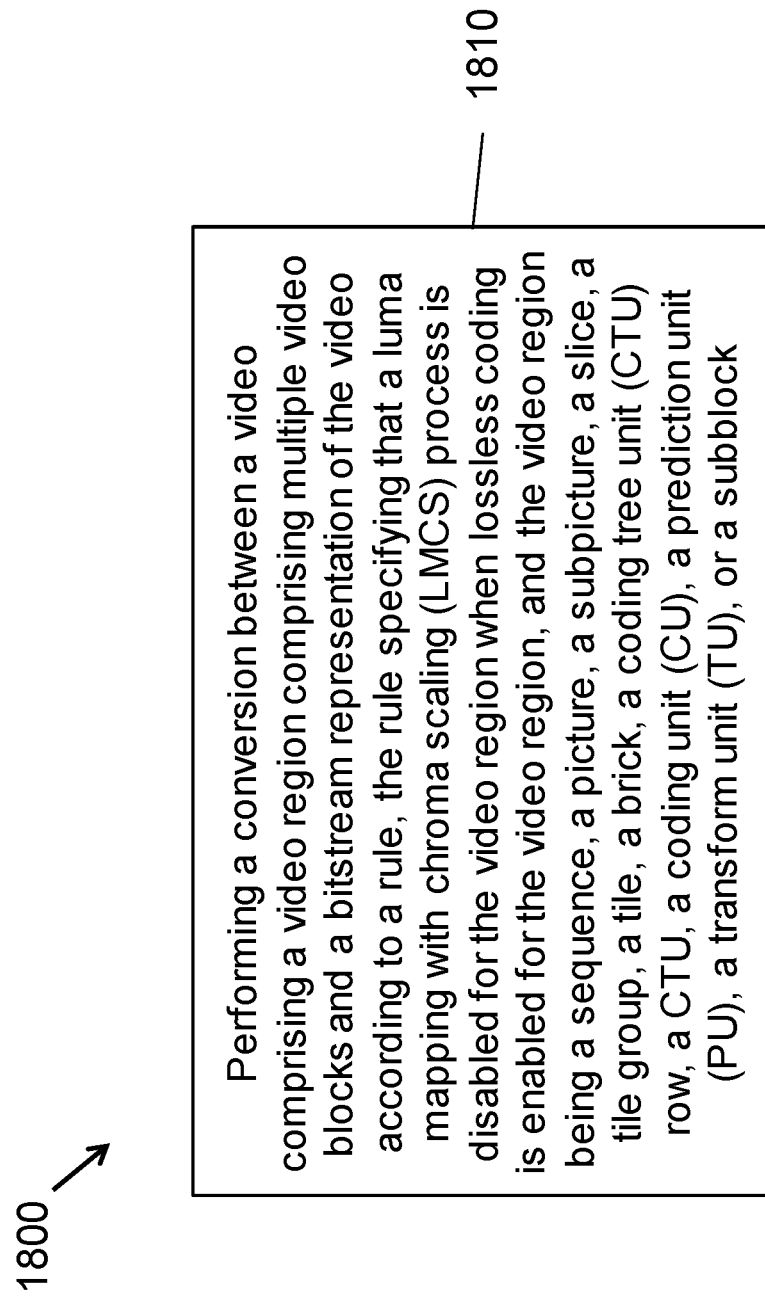
FIG. 18 is a flowchart for yet another example method of video processing.

FIG. 18 is a flowchart for a method 1800 of video processing. The method 1800 includes, at operation 1810, performing a conversion between a video comprising a video region comprising multiple video blocks and a bitstream representation of the video according to a rule, the rule specifying that a luma mapping with chroma scaling (LMCS) process is disabled for the video region when lossless coding is enabled for the video region, and the video region being a sequence, a picture, a subpicture, a slice, a tile group, a tile, a brick, a coding tree unit (CTU) row, a CTU, a coding unit (CU), a prediction unit (PU), a transform unit (TU), or a subblock.

In the methods 400-1800, in the ISP mode, a video block of the one or more video blocks is partitioned into multiple sub-partitions before application of an intra-prediction and transform.

In the methods 400-1800, the SBT comprises one or more transforms being separately applied to one or more partitions of a video block of the one or more video blocks.

In the methods 400-1800, the transform skip mode comprises skipping transform and inverse transform processes for a corresponding coding tool, and in the BDPCM mode, a residual of an intra prediction of the current video block is predictively coded using a differential pulse coding modulation operation.

In the methods 400-1800, in the CIIP mode, a final prediction of the video block is based on a weighted sum of an inter prediction of the video block and an intra prediction of the video block.

In the methods 400-1800, the LMCS process comprises luma samples of the video region being reshaped between a first domain and a second domain and a chroma residual being scaled in a luma-dependent manner.

In some embodiments, the following technical solutions may be implemented:

A1. A method of video processing, comprising using a dimension of a virtual pipeline data unit (VPDU) used for a conversion between a video comprising one or more video regions comprising one or more video blocks and a bitstream representation of the video to perform a determination of whether a ternary-tree (TT) or a binary tree (BT) partitioning of a video block of the one or more video blocks is enabled; and performing, based on the determination, the conversion, wherein the dimension is equal to VSize in luma samples, wherein dimensions of the video block are CtbSizeY in luma samples, wherein VSize=min(M, CtbSizeY), and wherein M is a positive integer.

A2. The method of solution A1, wherein M=64.

A3. The method of solution A1 or A2, wherein the dimension of the VPDU is a height or a width.

A4. The method of solution A1, wherein the determination is independent of a maximum transform size.

A5. The method of any of solutions A1 to A4, wherein VSize is a predetermined value.

A6. The method of solution A5, wherein VSize=64.

A7. The method of solution A1, wherein determination of the TT partitioning is based on a width or a height of the video block in luma samples being greater than min(VSize, maxTtSize), and wherein maxTtSize is a maximum transform size.

A8. The method of solution A1, wherein determination of the TT partitioning is based on a width or a height of the video block in luma samples being greater than VSize.

A9. The method of solution A7, wherein maxTtSize is 32×32 and VSize is 64×64, and wherein the TT partitioning is disabled when a size of the video block is 128×128, 128×64, or 64×128.

A10. The method of solution A7, wherein maxTtSize is 32×32 and VSize is 64×64, and wherein the TT partitioning is enabled when a size of the video block is 64×64.

A11. The method of solution A1, wherein the determination of a vertical BT partitioning is based on a width of the video block in luma samples being less than or equal to VSize and a height of the video block in luma samples being greater than VSize.

A12. The method of solution A11, wherein a maximum transform size is 32×32 and VSize is 64×64, and wherein the vertical BT partitioning is disabled when a size of the video block is 64×128.

A13. The method of solution A11, wherein a maximum transform size is 32×32 and VSize is 64×64, and wherein the vertical BT partitioning is enabled when a size of the video block is 32×64, 16×64, or 8×64.

A14. The method of solution A1, wherein a vertical BT partitioning is disabled when (i) a sum of a width of the video block in luma samples and a horizontal coordinate of a top-left luma sample of the video block is greater than a width of a picture or a width of a subpicture comprising the video block in luma samples and (ii) a height of the video block in luma samples is greater than VSize.

A15. The method of solution A1, wherein a horizontal BT partitioning is enabled when a sum of a width of the video block in luma samples and a horizontal coordinate of a top-left luma sample of the video block is greater than a width of a picture or a width of a subpicture comprising the video block in luma samples.

A16. The method of solution A1, wherein the determination of a horizontal BT partitioning is based on a width of the video block in luma samples being greater than VSize and a height of the video block in luma samples being less than or equal to VSize.

A17. The method of solution A16, wherein a maximum transform size is 32×32 and VSize is 64×64, and wherein the horizontal BT partitioning is disabled when a size of the video block is 128×64.

A18. The method of solution A16, wherein a maximum transform size is 32×32 and VSize is 64×64, and wherein the horizontal BT partitioning is enabled when a size of the video block is 64×8, 64×16, or 64×32.

A19. The method of solution A1, wherein a horizontal BT partitioning is disabled when (i) a sum of a height of the video block in luma samples and a vertical coordinate of a top-left luma sample of the video block is greater than a height of a picture or a height of a subpicture comprising the video block in luma samples and (ii) a width of the video block in luma samples is greater than VSize.

A20. The method of solution A1, wherein a vertical BT partitioning is enabled when a sum of a height of the video block in luma samples and a vertical coordinate of a top-left luma sample of the video block is greater than a height of a picture or a height of a subpicture comprising the video block in luma samples.

A21. The method of solution A1, wherein the TT or the BT partitioning is disabled and an indication of the TT or the BT partitioning is excluded from the bitstream representation, and wherein the indication is implicitly derived to be a predetermined value that indicates the TT or the BT partitioning is disabled.

A22. The method of solution A21, wherein the predetermined value is zero.

A23. The method of solution A1, wherein the TT or the BT partitioning is enabled and an indication of the TT or the BT partitioning is signaled in the bitstream representation.

A24. The method of solution A1, wherein the TT or the BT partitioning is disabled, wherein an indication of the TT or the BT partitioning is signaled in the bitstream representation, and wherein the indication is ignored by a decoder.

A25. The method of solution A1, wherein the TT or the BT partitioning is disabled, wherein an indication of the TT or the BT partitioning is signaled in the bitstream representation, and wherein the indication is zero based on the TT or the BT partitioning being disabled.

A26. A method of video processing, comprising using, for a conversion between a video comprising one or more video regions comprising one or more video blocks and a bitstream representation of the video, a dimension of a video block of the one or more video blocks to perform a determination of whether a ternary-tree (TT) or a binary-tree (BT) partitioning of the video block is enabled; and performing, based on the determination, the conversion.

A27. The method of solution A26, wherein the determination of the TT or the BT partitioning is based on a height or a width of the video block in luma samples being greater than N, and wherein N is a positive integer.

A28. The method of solution A27, wherein N=64.

A29. The method of solution A27 or 28, wherein a maximum transform size is 32×32, and wherein the TT partitioning is disabled when a size of the video block is 128×128, 128×64, or 64×128.

A30. The method of solution A27 or 28, wherein a maximum transform size is 32×32, and wherein the TT partitioning is enabled when a size of the video block is 64×64.

A31. The method of solution A26, wherein the determination of a vertical BT partitioning is based on a width of the video block in luma samples being less than or equal to N and a height of the video block in luma samples being greater than N, and wherein N is a positive integer.

A32. The method of solution A31, wherein N=64.

A33. The method of solution A31 or 32, wherein a maximum transform size is 32×32, and wherein the vertical BT partitioning is disabled when a size of the video block is 64×128.

A34. The method of solution A31 or 32, wherein a maximum transform size is 32×32, and wherein the vertical BT partitioning is enabled when a size of the video block is 32×64, 16×64, or 8×64.

A35. The method of solution A26, wherein a vertical BT partitioning is disabled when (i) a sum of a width of the video block in luma samples and a horizontal coordinate of a top-left luma sample of the video block is greater than a width of a picture or a width of a subpicture comprising the video block in luma samples and (ii) a height of the video block in luma samples is greater than 64.

A36. The method of solution A26, wherein a horizontal BT partitioning is enabled when a sum of a width of the video block in luma samples and a horizontal coordinate of a top-left luma sample of the video block is greater than a width of a picture or a width of a subpicture comprising the video block in luma samples.

A37. The method of solution A26, wherein the determination of a horizontal BT partitioning is based on a width of the video block in luma samples being greater than N and a height of the video block in luma samples being less than or equal to N, and wherein N is an integer.

A38. The method of solution A37, wherein N=64.

A39. The method of solution A37 or 38, wherein a maximum transform size is 32×32, and wherein the horizontal BT partitioning is disabled when a size of the video block is 128×64.

A40. The method of solution A37 or 38, wherein a maximum transform size is 32×32, and wherein the horizontal BT partitioning is enabled when a size of the video block is 64×8, 64×16, or 64×32.

A41. The method of solution A26, wherein a horizontal BT partitioning is disabled when (i) a sum of a height of the video block in luma samples and a vertical coordinate of a luma sample of the video block is greater than a height of a picture or a height of a subpicture comprising the video block in luma samples and (ii) a width of the video block in luma samples is greater than N, and wherein N is a positive integer.

A42. The method of solution A26, wherein a vertical BT partitioning is enabled when a sum of a height of the video block in luma samples and a vertical coordinate of a top-left luma sample of the video block is greater than a height of a picture or a height of a subpicture comprising the video block in luma samples.

A43. The method of any of solutions A1 to A42, wherein the video block corresponds to a coding tree unit (CTU) representing a logical partition used for coding the video into the bitstream representation.

A44. The method of any of solutions A1 to A43, wherein performing the conversion comprises generating the bitstream representation from the video region.

A45. The method of any of solutions A1 to A43, wherein performing the conversion comprises generating the video region from the bitstream representation.

A46. An apparatus in a video system comprising a processor and a non-transitory memory with instructions thereon, wherein the instructions upon execution by the processor, cause the processor to implement the method in any one of solutions A1 to A45.

A47. A computer program product stored on a non-transitory computer readable media, the computer program product including program code for carrying out the method in any one of solutions A1 to A45.

In some embodiments, the following technical solutions may be implemented:

B1. A method of video processing, comprising using a height or a width of a video block to perform a determination of whether a coding tool is enabled for a conversion between a video comprising one or more video regions comprising one or more video blocks comprising the video block and a bitstream representation of the video; and performing, based on the determination, the conversion, wherein the determination is based on a comparison between the height or the width with a value N, where N is a positive integer.

B2. The method of solution B1, wherein N=64.

B3. The method of solution B1, wherein N=128.

B4. The method of any of solutions B1 to B3, wherein the coding tool that is disabled comprises a palette coding mode, an intra block copy (IBC) mode, and/or a combined intra-inter prediction (CIIP) mode.

B5. The method of any of solutions B1 to B4, wherein the coding tool further comprises an intra skip mode, a triangle prediction mode, a regular merge mode, a decoder side motion derivation mode, a bi-directional optical flow mode, a prediction refinement based optical flow mode, an affine prediction mode, and/or a sub-block based temporal motion vector prediction (TMVP) mode.

B6. The method of any of solutions B1 to B3, wherein the coding tool that is enabled comprises a palette coding mode and/or an intra block copy (IBC) mode.

B7. The method of any of solutions B1 to B3, wherein the bitstream representation comprises an explicit syntax constraint for disabling the coding tool.

B8. The method of solution B7, wherein the explicit syntax constraint comprises a palette coding mode flag and/or an intra block copy (IBC) mode flag.

B9. The method of any of solutions B1 to B8, wherein the video block comprises a coding unit (CU) or a prediction unit (PU).

B10. A method of video processing, comprising using comparison between a height or a width of a video block and a size of a transform block to perform a determination of whether a coding tool is enabled for a conversion between a video comprising one or more video regions comprising one or more video blocks comprising the video block and a bitstream representation of the video; and performing, based on the determination, the conversion.

B11. The method of solution B10, wherein the coding tool comprises intra sub-partition prediction (ISP), matrix-based intra prediction (MIP), a sub-block transform (SBT), or a coding tool that splits one coding unit (CU) associated with the video region into multiple transform units (TUs) or one coding block associated with the video region into multiple transform blocks (TBs).

B12. The method of solution B10, wherein the coding tool comprises a transform skip mode, block-based delta pulse code modulation (BDPCM), DPCM, or PCM.

B13. The method of solution B10, wherein the coding tool comprises an intra block copy (IBC) mode or a palette mode (PLT).

B14. The method of solution B10, wherein the coding tool comprises a combined intra-inter prediction (CIIP) mode.

B15. A method of video processing, comprising using a height or a width of a video block to perform a determination of whether a coding tool is enabled for a conversion between a video comprising one or more video regions comprising one or more video blocks comprising the video block and a bitstream representation of the video; and performing, based on the determination, the conversion.

B16. The method of solution B15, wherein the coding tool comprises an intra sub-partition prediction (ISP), a sub-block transform (SBT), an intra block copy (IBC), or a palette mode.

B17. The method of solution B15, wherein the coding tool comprises an intra sub-partition prediction (ISP) that is enabled when the height or the width of the video block in luma samples is less than or equal to N, and wherein N is a positive integer.

B18. The method of solution B15, wherein the coding tool comprises an intra sub-partition prediction (ISP) that is disabled when the height or the width of the video block in luma samples is greater than N, and wherein N is a positive integer.

B19. The method of solution B17 or B18, wherein N=64.

B20. The method of solution B15, wherein the determination is based on a comparison between the height or the width of the video block with a size of a virtual pipeline data unit (VPDU).

B21. The method of solution B20, wherein the coding tool is enabled when the height or the width of the video block in luma samples is less than or equal to the size of the VPDU.

B22. The method of solution B20, wherein the coding tool is disabled when the height or the width of the video block in luma samples is greater than the size of the VPDU.

B23. The method of solution B21 or B22, wherein the size of the VPDU is 32 or 64.

B24. A method of video processing, comprising using a comparison between a dimension of a sub-partition of a video block and a maximum transform size to perform (a) a determination of whether an intra sub-partition prediction (ISP) mode is enabled for a conversion between a video comprising one or more video regions comprising one or more video blocks comprising the video block, and (b) a selection of one or more allowable partition types for the conversion; and performing, based on the determination and the selection, the conversion, wherein, in the ISP mode, a video block of the one or more video blocks is partitioned into multiple sub-partitions before application of an intra-prediction and transform.

B25. The method of solution B24, wherein the ISP mode is enabled when a height or a width of the video block is less than or equal to the maximum transform size for at least one of the one or more allowable partition types.

B26. The method of solution B24, wherein the ISP mode is disabled when a height or a width of the video block is greater than the maximum transform size for at least one of the one or more allowable partition types.

B27. The method of solution B24, wherein the ISP mode is enabled when a height or a width of the video block is less than or equal to the maximum transform size for each of the one or more allowable partition types.

B28. The method of solution B24, wherein the ISP mode is disabled when a height or a width of the video block is greater than the maximum transform size for each of the one or more allowable partition types.

B29. The method of solution B24, wherein signaling the one or more allowable partition types in the bitstream representation is based on a relationship between a height or a width of a corresponding sub-partition and the maximum transform size.

B30. The method of solution B24, wherein signaling the one or more allowable partition types in the bitstream representation is based on a relationship between a height or a width of the video block and the maximum transform size.

B31. The method of solution B24, wherein enabling or disabling an application of a coding tool on the video block is based on a relationship between a size of the video block and the maximum transform size.

B32. The method of solution B31, wherein the maximum transform size is 32 or 64.

B33. The method of solution B31 or B32, wherein the coding tool is enabled when a height or a width of the video block is less than or equal to the maximum transform size.

B34. The method of any of solutions B31 to B33, wherein the coding tool comprises an intra block copy (IBC) mode or a palette mode.

B35. A method of video processing, comprising performing a conversion between a video comprising one or more video regions comprising one or more video blocks and a bitstream representation of the video, wherein the conversion comprises a coding tool that has been disabled, and wherein syntax elements related to the coding tool are excluded from the bitstream representation and inferred to be a predetermined value specifying that the coding tool is disabled.

B36. A method of video processing, comprising performing a conversion between a video comprising one or more video regions comprising one or more video blocks and a bitstream representation of the video, wherein the conversion comprises a coding tool that has been disabled, and wherein the bitstream representation comprises syntax elements related to the coding tool that are inferred to be a predetermined value based on the coding tool being disabled.

B37. The method of solution B35 or B36, wherein the predetermined value is zero.

B38. The method of solution B35 or B36, wherein the coding tool comprises an intra sub-partition prediction (ISP), and wherein the syntax elements indicate whether a video block of the one or more video blocks is divided into multiple sub-partitions (denoted intra_subpartitions_mode_flag) and/or how to partition the video block into multiple sub-partitions (denoted intra_subpartitions_split_flag).

B39. The method of solution B35 or B36, wherein the coding tool comprises a matrix-based intra prediction (MIP), and wherein the syntax elements indicate whether a video block of the one or more video blocks uses the MIP (denoted intra_mip_flag) and/or an indication of an MIP mode index (denoted intra_mip_mode).

B40. The method of solution B35 or B36, wherein the coding tool comprises an intra block copy (IBC) mode, and wherein the syntax elements indicate whether a video block of the one or more video blocks uses the IBC mode (denoted pred_mode_ibc_flag).

B41. The method of solution B35 or B36, wherein the coding tool comprises a palette mode, and wherein the syntax elements indicate whether a video block of the one or more video blocks uses a palette mode (denoted pred_mode_plt_flag).

B42. A method of video processing, comprising using a dimension of a virtual pipeline data unit (VPDU) and/or a maximum transform size used for a conversion between a video comprising one or more video regions comprising one or more video blocks and a bitstream representation of the video to perform a determination of whether an implicit (QT) partitioning of a video block of the one or more video blocks is enabled; and performing, based on the determination, the conversion.

B43. The method of solution B42, wherein each sub-partition of the implicit QT partitioning is recursively partitioned until a size of the sub-partition equals a size of the VPDU.

B44. The method of solution B42, wherein each sub-partition of the implicit QT partitioning is recursively partitioned until a size of the sub-partition equals the maximum transform size.

B45. A method of video processing, comprising performing a conversion between a video comprising one or more video regions comprising one or more video blocks and a bitstream representation of the video, wherein the conversion comprises a sub-block transform (SBT), wherein a maximum height or a maximum width of the SBT is based on a maximum transform size, and wherein the SBT comprises one or more transforms being separately applied to one or more partitions of a video block of the one or more video blocks.

B46. The method of solution B45, wherein at least one of the maximum height or the maximum width of the SBT is set equal to the maximum transform size.

B47. The method of solution B45, wherein the bitstream representation excludes a syntax element related to the maximum height or the maximum width of the SBT.

B48. The method of solution B47, wherein the syntax element is sps_sbt_max_size_64_flag and is inferred to be a predetermined value indicating the maximum transform size is less than 64.

B49. The method of solution B48, wherein the predetermined value is zero.

B50. The method of solution B47, wherein signaling a syntax element related to the SBT in the bitstream representation is based on the maximum transform size.

B51. A method of video processing, comprising performing a conversion between a video comprising one or more video regions comprising one or more video blocks and a bitstream representation of the video, wherein the conversion comprises a transform skip mode and/or an intra block-based differential pulse code modulation (BDPCM) mode, wherein a maximum block size used for the transform skip mode is based on a maximum transform size, wherein the transform skip mode comprises skipping transform and inverse transform processes for a corresponding coding tool, and wherein, in the BDPCM mode, a residual of an intra prediction of the current video block is predictively coded using a differential pulse coding modulation operation.

B52. The method of solution B51, wherein the maximum block size for the transform skip mode is set equal to the maximum transform size.

B53. The method of solution B51, wherein the bitstream representation excludes a syntax element related to the maximum block size for the transform skip mode.

B54. The method of solution B51, wherein a maximum block size used for the intra BDPCM mode is independently signaled in the bitstream representation.

B55. The method of solution B54, wherein a maximum block size used for the intra BDPCM mode is not based on the maximum block size for the transform skip mode.

B56. The method of solution B51, wherein a maximum block size used for the intra BDPCM mode is signaled in a sequence parameter set (SPS), a video parameter set (VPS), a picture parameter set (PPS), a slice header, a virtual pipeline data unit (VPDU), a coding tree unit (CTU), or a coding unit (CU) in the bitstream representation.

B57. A method of video processing, comprising using a comparison between a height or a width of a video block and a maximum transform size to perform a determination of whether a combined inter intra prediction (CIIP) mode is enabled for a conversion between a video comprising one or more video regions comprising one or more video blocks comprising the video block and a bitstream representation of the video; and performing, based on the determination, the conversion, wherein, in the CIIP mode, a final prediction of the video block is based on a weighted sum of an inter prediction of the video block and an intra prediction of the video block.

B58. The method of solution B57, wherein the CIIP mode is disabled when the height and/or the width of the video block is greater than the maximum transform size.

B59. A method of video processing, comprising making a determination, for a conversion between a video comprising one or more video regions comprising one or more video blocks and a bitstream representation of the video, regarding partitioning a video block of the one or more video blocks coded with combined inter intra prediction (CIIP); and performing, based on the determination, the conversion, wherein, in the CIIP mode, a final prediction of the video block is based on a weighted sum of an inter prediction of the video block and an intra prediction of the video block.

B60. The method of solution B59, wherein the video block is not partitioned when a height and a width of the coding unit are less than 128.

B61. The method of solution B59, wherein the video block is not partitioned when a height and a width of the coding unit are less than or equal to 64.

B62. The method of solution B59, wherein the video block is partitioned into multiple sub-partitions, wherein an intra-prediction for a first sub-partition of the multiple sub-partitions is based on a reconstruction of a second partition of the multiple sub-partitions, and wherein the intra-prediction of the second is performed prior to the intra-prediction of the first sub-partition.

B63. The method of any of solutions B59 to B62, wherein the video block is a coding unit (CU).

B64. A method of video processing, comprising performing a conversion between a video comprising a video region comprising multiple video blocks and a bitstream representation of the video according to a rule, wherein the rule specifies that a maximum block size of the multiple video blocks in the video region that are coded in the bitstream representation using a transform coding determines a maximum block size of the multiple video blocks in the video region that are coded in the bitstream representation without using transform coding.

B65. The method of solution B64, wherein the maximum size for the transform skip mode is equal to MaxTbSizeY.

B66. The method of solution B64, wherein the bitstream representation excludes an indication of the maximum size for the transform skip mode.

B67. A method of video processing, comprising performing a conversion between a video comprising a video region comprising multiple video blocks and a bitstream representation of the video according to a rule, wherein the rule specifies that a luma mapping with chroma scaling (LMCS) process is disabled for the video region when lossless coding is enabled for the video region, wherein the video region is a sequence, a picture, a subpicture, a slice, a tile group, a tile, a brick, a coding tree unit (CTU) row, a CTU, a coding unit (CU), a prediction unit (PU), a transform unit (TU), or a subblock, and wherein the LMCS process comprises luma samples of the video region being reshaped between a first domain and a second domain and a chroma residual being scaled in a luma-dependent manner.

B68. The method of solution B67, wherein signaling an indication related to the LMCS process is based on a transform quantization bypass flag for the video region.

B69. The method of solution B68, wherein the indication related to the LMCS process is excluded from the bitstream representation and inferred to be zero when the transform quantization bypass flag is equal to one.

B70. The method of any of solutions B1 to B69, wherein performing the conversion comprises generating the bitstream representation from the video region.

B71. The method of any of solutions B1 to B69, wherein performing the conversion comprises generating the video region from the bitstream representation.

B72. An apparatus in a video system comprising a processor and a non-transitory memory with instructions thereon, wherein the instructions upon execution by the processor, cause the processor to implement the method in any one of solutions B1 to B71.

B73. A computer program product stored on a non-transitory computer readable media, the computer program product including program code for carrying out the method in any one of solutions B1 to B71.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
    determining, based on a dimension of a current video block of a video, whether a first partitioning process that splits the current video block into two sub-blocks or a second partitioning process that splits the current video block into three sub-blocks in a horizontal direction or a vertical direction is allowed or not, wherein the dimension of the current video block comprises a height or a width of the current video block in luma samples; and
    performing, based on the determining, a conversion between the current video block and a bitstream of the video,
    wherein the first partitioning process in the vertical direction is disabled in a case where (i) a sum of the width of the current video block in luma samples and a horizontal coordinate of a top-left luma sample of the current video block is greater than a width of a picture or a width of a subpicture comprising the current video block in luma samples and (ii) the height of the current video block in luma samples is greater than N; wherein N=64;
    wherein the second partitioning process is disabled in a case where the height or the width of the current video block in luma samples being greater than 64;
    wherein the first partitioning process in the vertical direction is disabled in a case where (i) the width of the current video block in luma samples is less than or equal to N and (ii) the height of the current video block in luma samples is greater than N;
    wherein the first partitioning process in the horizontal direction is disabled in a case where (i) the width of the current video block in luma samples is greater than N and (ii) the height of the current video block in luma samples is less than or equal to N;
    wherein the first partitioning process in the horizontal direction is disabled in a case where (i) a sum of the height of the current video block in luma samples and a vertical coordinate of the top-left luma sample of the current video block is greater than a height of a picture or a height of a subpicture comprising the current video block in luma samples and (ii) the width of the current video block in luma samples is greater than N;
    wherein, it cannot be determined that the first partitioning process in the horizontal direction is disabled only according to a condition that a sum of the width of the current video block in luma samples and a horizontal coordinate of a top-left luma sample of the current video block is greater than a width of a picture comprising the current video block in luma samples; and
    wherein the first partitioning process comprises a binary tree (BT) partition, and the second partitioning process comprises a ternary tree (TT) partition.

2. The method of claim 1, further comprises: determining whether the first partitioning process or the second partitioning process is allowed or not to be independent of a maximum transform size.

3. The method of claim 2, wherein the maximum transform size is dependent on a dimension of a coding tree unit, and the dimension of the coding tree unit comprises a width and/or a height of the coding tree unit.

4. The method of claim 2, wherein the maximum transform size is less than or equal to the dimension of a coding tree unit.

5. The method of claim 2, wherein in a case where the dimension of a coding tree unit is less than M, the maximum transform size is less than M, where M=64.

6. The method of claim 1, wherein the conversion comprises encoding the current video block into the bitstream.

7. The method of claim 1, wherein the conversion comprises decoding the current video block from the bitstream.

8. An apparatus for processing video data comprising a processor and a non-transitory memory with instructions thereon, wherein the instructions upon execution by the processor, cause the processor to:
    determine, based on a dimension of a current video block of a video, whether a first partitioning process that splits the current video block into two sub-blocks or a second partitioning process that splits the current video block into three sub-blocks in a horizontal direction or a vertical direction is allowed or not, wherein the dimension of the current video block comprises a height or a width of the current video block in luma samples; and
    perform, based on the determining, a conversion between the current video block and a bitstream of the video,
    wherein the first partitioning process in the vertical direction is disabled in a case where (i) a sum of the width of the current video block in luma samples and a horizontal coordinate of a top-left luma sample of the current video block is greater than a width of a picture or a width of a subpicture comprising the current video block in luma samples and (ii) the height of the current video block in luma samples is greater than N; wherein N=64;

wherein the second partitioning process is disabled in a case where the height or the width of the current video block in luma samples being greater than 64;

wherein the first partitioning process in the vertical direction is disabled in a case where (i) the width of the current video block in luma samples is less than or equal to N and (ii) the height of the current video block in luma samples is greater than N;

wherein the first partitioning process in the horizontal direction is disabled in a case where (i) the width of the current video block in luma samples is greater than N and (ii) the height of the current video block in luma samples is less than or equal to N;

wherein the first partitioning process in the horizontal direction is disabled in a case where (i) a sum of the height of the current video block in luma samples and a vertical coordinate of the top-left luma sample of the current video block is greater than a height of a picture or a height of a subpicture comprising the current video block in luma samples and (ii) the width of the current video block in luma samples is greater than N;

wherein, it cannot be determined that the first partitioning process in the horizontal direction is disabled only according to a condition that a sum of the width of the current video block in luma samples and a horizontal coordinate of a top-left luma sample of the current video block is greater than a width of a picture comprising the current video block in luma samples; and wherein the first partitioning process comprises a binary tree (BT) partition, and the second partitioning process comprises a ternary tree (TT) partition.

9. A non-transitory computer-readable storage medium storing instructions that cause a processor to:

determine, based on a dimension of a current video block of a video, whether a first partitioning process that splits the current video block into two sub-blocks or a second partitioning process that splits the current video block into three sub-blocks in a horizontal direction or a vertical direction is allowed or not, wherein the dimension of the current video block comprises a height or a width of the current video block in luma samples; and perform, based on the determining, a conversion between the current video block and a bitstream of the video, wherein the first partitioning process in the vertical direction is disabled in a case where (i) a sum of the width of the current video block in luma samples and a horizontal coordinate of a top-left luma sample of the current video block is greater than a width of a picture or a width of a subpicture comprising the current video block in luma samples and (ii) the height of the current video block in luma samples is greater than N; wherein N=64;

wherein the second partitioning process is disabled in a case where the height or the width of the current video block in luma samples being greater than 64;

wherein the first partitioning process in the vertical direction is disabled in a case where (i) the width of the current video block in luma samples is less than or equal to N and (ii) the height of the current video block in luma samples is greater than N;

wherein the first partitioning process in the horizontal direction is disabled in a case where (i) the width of the current video block in luma samples is greater than N and (ii) the height of the current video block in luma samples is less than or equal to N;

wherein the first partitioning process in the horizontal direction is disabled in a case where (i) a sum of the height of the current video block in luma samples and a vertical coordinate of the top-left luma sample of the current video block is greater than a height of a picture or a height of a subpicture comprising the current video block in luma samples and (ii) the width of the current video block in luma samples is greater than N;

wherein, it cannot be determined that the first partitioning process in the horizontal direction is disabled only according to a condition that a sum of the width of the current video block in luma samples and a horizontal coordinate of a top-left luma sample of the current video block is greater than a width of a picture comprising the current video block in luma samples; and wherein the first partitioning process comprises a binary tree (BT) partition, and the second partitioning process comprises a ternary tree (TT) partition.

10. A non-transitory computer-readable recording medium storing a bitstream of a video which is generated by a method performed by a video processing apparatus, wherein the method comprises:

determining, based on a dimension of a current video block of the video, whether a first partitioning process that splits the current video block into two sub-blocks or a second partitioning process that splits the current video block into three sub-blocks in a horizontal direction or a vertical direction is allowed or not, wherein the dimension of the current video block comprises a height or a width of the current video block in luma samples; and generating the bitstream based on the determining, wherein the first partitioning process in the vertical direction is disabled in a case where (i) a sum of the width of the current video block in luma samples and a horizontal coordinate of a top-left luma sample of the current video block is greater than a width of a picture or a width of a subpicture comprising the current video block in luma samples and (ii) the height of the current video block in luma samples is greater than N; wherein N=64;

wherein the second partitioning process is disabled in a case where the height or the width of the current video block in luma samples being greater than 64;

wherein the first partitioning process in the vertical direction is disabled in a case where (i) the width of the current video block in luma samples is less than or equal to N and (ii) the height of the current video block in luma samples is greater than N;

wherein the first partitioning process in the horizontal direction is disabled in a case where (i) the width of the current video block in luma samples is greater than N and (ii) the height of the current video block in luma samples is less than or equal to N;

wherein the first partitioning process in the horizontal direction is disabled in a case where (i) a sum of the height of the current video block in luma samples and a vertical coordinate of the top-left luma sample of the current video block is greater than a height of a picture or a height of a subpicture comprising the current video block in luma samples and (ii) the width of the current video block in luma samples is greater than N;

wherein, it cannot be determined that the first partitioning process in the horizontal direction is disabled only according to a condition that a sum of the width of the current video block in luma samples and a horizontal coordinate of a top-left luma sample of the current video block is greater than a width of a picture comprising the current video block in luma samples; and
wherein the first partitioning process comprises a binary tree (BT) partition, and the second partitioning process comprises a ternary tree (TT) partition.

11. The non-transitory computer-readable recording medium of claim 10, wherein the method further comprises:
determining whether the first partitioning process or the second partitioning process is allowed or not to be independent of a maximum transform size,
wherein the maximum transform size is dependent on a dimension of a coding tree unit, and the dimension of the coding tree unit comprises a width and/or a height of the coding tree unit;
wherein the maximum transform size is less than or equal to the dimension of the coding tree unit; and
wherein in a case where the dimension of the coding tree unit is less than M, the maximum transform size is less than M, where M=64.

12. The apparatus of claim 8, further comprises: determining whether the first partitioning process or the second partitioning process is allowed or not to be independent of a maximum transform size.

13. The apparatus of claim 12, wherein the maximum transform size is dependent on a dimension of a coding tree unit, and the dimension of the coding tree unit comprises a width and/or a height of the coding tree unit.

14. The apparatus of claim 12, wherein the maximum transform size is less than or equal to the dimension of a coding tree unit.

15. The apparatus of claim 12, wherein in a case where the dimension of a coding tree unit is less than M, the maximum transform size is less than M, where M=64.

16. The non-transitory computer-readable storage medium of claim 9, wherein the instructions further cause the processor to: determine whether the first partitioning process or the second partitioning process is allowed or not to be independent of a maximum transform size.

17. The non-transitory computer-readable storage medium of claim 16, wherein the maximum transform size is dependent on a dimension of a coding tree unit, and the dimension of the coding tree unit comprises a width and/or a height of the coding tree unit.

18. The non-transitory computer-readable storage medium of claim 16, wherein the maximum transform size is less than or equal to the dimension of a coding tree unit.

19. The non-transitory computer-readable storage medium of claim 16, wherein in a case where the dimension of a coding tree unit is less than M, the maximum transform size is less than M, where M=64.

* * * * *